United States Patent
Zuideveld et al.

(10) Patent No.: US 12,378,332 B2
(45) Date of Patent: Aug. 5, 2025

(54) PROCESS FOR POLYMERIZATION OF POLYPROPYLENE USING ZIEGLER-NATTA PROCATALYST WITH NOVEL 1,3-DIETHER INTERNAL DONORS

(71) Applicant: SABIC GLOBAL TECHNOLOGIES B.V., Bergen op Zoom (NL)

(72) Inventors: Martin Alexander Zuideveld, Kelmis (BE); Anika Meppelder, Aachen (DE); Dafne Lise Steinfort, Sittard (NL); Kiran Arunkumar Puthamane, Bangalore (IN); Mudubagilu Udaya Kumar, Baroda (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 330 days.

(21) Appl. No.: 17/766,353

(22) PCT Filed: Sep. 29, 2020

(86) PCT No.: PCT/EP2020/077198
§ 371 (c)(1),
(2) Date: Apr. 4, 2022

(87) PCT Pub. No.: WO2021/063930
PCT Pub. Date: Apr. 8, 2021

(65) Prior Publication Data
US 2024/0067765 A1 Feb. 29, 2024

(30) Foreign Application Priority Data
Oct. 4, 2019 (EP) .................................... 19201399

(51) Int. Cl.
| C08F 4/649 | (2006.01) |
| C08F 4/02 | (2006.01) |
| C08F 4/659 | (2006.01) |
| C08F 110/06 | (2006.01) |

(52) U.S. Cl.
CPC ............ *C08F 4/6494* (2013.01); *C08F 4/022* (2013.01); *C08F 4/65912* (2013.01); *C08F 4/65916* (2013.01); *C08F 110/06* (2013.01)

(58) Field of Classification Search
CPC .... C08F 4/6491; C08F 4/022; C08F 4/65912; C08F 4/65916; C08F 110/06
USPC ........................................ 502/103, 104, 113
See application file for complete search history.

(56) References Cited

U.S. PATENT DOCUMENTS

2014/0275452 A1  9/2014  Chang

FOREIGN PATENT DOCUMENTS

| EP | 1222214 B1 | 9/1999 | |
| WO | 2007134851 A1 | 11/2007 | |
| WO | WO-2014149628 A1 * | 9/2014 | ............ C08F 110/06 |
| WO | 2015185490 A1 | 12/2015 | |
| WO | 2016203017 A1 | 12/2016 | |
| WO | WO-2018067367 A1 * | 4/2018 | .............. C08F 10/06 |
| WO | 2018167301 A1 | 9/2018 | |
| WO | WO-2019094216 A1 * | 5/2019 | .............. B01J 21/10 |

OTHER PUBLICATIONS

International Search Report for International Application No. PCT/EP2020/077198, International Filing Date Sep. 29, 2020, Date of Mailing Feb. 24, 2021, 5 pages.
Written Opinion for International Application No. PCT/EP2020/077198, International Filing Date Sep. 29, 2020, Date of Mailing Feb. 24, 2021, 7 pages.

* cited by examiner

*Primary Examiner* — Patricia L. Hailey
(74) *Attorney, Agent, or Firm* — CANTOR COLBURN LLP

(57) ABSTRACT

A process for preparing a procatalyst for polymerization of olefins, comprising contacting a magnesium-containing support with a halogen-containing titanium compound, and an internal electron donor according to Formula (I), said process comprising the steps of: i) contacting a compound $R^4_z MgX^4_{2-z}$ with an alkoxy- or aryloxy-containing silane compound to give a first intermediate reaction product, being a solid $Mg(OR^1)_x X^1_{2-x}$, ii) optionally contacting the solid $Mg(OR^1)_x X^1$ 2-x obtained in step ii) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate product; iii) contacting the first or second intermediate reaction product, obtained respectively in step i) or ii), with a halogen-containing Ti-compound and said compound represented Formula (I), as the internal electron donor.

20 Claims, No Drawings

PROCESS FOR POLYMERIZATION OF POLYPROPYLENE USING ZIEGLER-NATTA PROCATALYST WITH NOVEL 1,3-DIETHER INTERNAL DONORS

CROSS REFERENCE TO RELATED APPLICATIONS

This application is a National Stage application of PCT/EP2020/077198, filed Sep. 29, 2020, which claims the benefit of European Application No. 19201399.3, filed Oct. 4, 2019, both of which are incorporated by reference in their entirety herein.

TECHNICAL FIELD

The present invention relates to a process for polymerization of polypropylene using Ziegler-Natta procatalyst with novel 1,3-diether internal donors having a specific combination of alkyl substitution on the 2,2'-position.

BACKGROUND

Catalyst systems and their components that are suitable for preparing a polyolefin are generally known. One type of such procatalysts are generally referred to as Ziegler-Natta procatalysts. The term "Ziegler-Natta" is known in the art and it typically refers to catalyst systems comprising a transition metal-containing solid catalyst compound (also typically referred to as a procatalyst); an organometallic compound (also typically referred to as a co-catalyst) and optionally one or more electron donor compounds (e.g. external electron donors).

The use of a butyl Grignard magnesium based solid support for specific Ziegler-Natta procatalysts is known from WO2015185490A1 from the present applicant. This specific procatalyst has a positive effect on the broadness of the Molecular Weight distribution (MWD). The present inventors have, however, observed that these procatalyst sometimes have a somewhat lower procatalyst yield and internal donor content, even when using the same synthetic protocols, compared to procatalyst using phenyl Grignard magnesium based solid support.

SUMMARY

It is an object of the present invention to provide an improved process of preparing a procatalyst comprising 1,3-diethers. It is a further object of the present invention to provide a procatalyst that has the benefit of a high polymer yield during the polymerization process and provides polymers having a high isotacticity. It is a further objection of the present invention to provide a phthalate free procatalyst that provides a good balance between (high) activity and stereoselectivity during the polymerisation process and that provides polymers having low xylene solubles.

The present inventors have identified a specific alkyl substitution pattern for internal electron donors having a 1,3-diether backbone, which—when used in a Ziegler-Natta procatalyst—enhance the activity during the polymerization process as well as the isotacticity of the polymer obtained of these Ziegler-Natta procatalyst, especially the specific Ziegler-Natta procatalyst using a butyl-Grignard based support.

In a first aspect, the present invention relates to a process for preparing a procatalyst for polymerization of olefins, comprising contacting a magnesium-containing support with a halogen-containing titanium compound, and an internal electron donor according to Formula I:

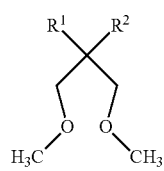

Formula I wherein $R^1$ is a secondary alkyl group and $R^2$ is a non-secondary alkyl group having at least 5 carbon atoms, preferably $R^2$ is a non-secondary alkyl group being branched at the 3-position or further positions; said process comprising the steps of:

i) contacting a compound $R^4_z MgX^4_{2-z}$ with an alkoxy- or aryloxy-containing silane compound to give a first intermediate reaction product, being a solid $Mg(OR^a)_x X^1_{2-x}$, wherein: $R^a$ is a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; wherein $R^4$ is a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms, preferably $R^4$ is butyl; wherein $X^4$ and $X^1$ are each independently selected from the group of consisting of fluoride (F—), chloride (Cl—), bromide (Br—) or iodide (I—), preferably chloride; z is in a range of larger than 0 and smaller than 2, being $0<z<2$;

ii) contacting the solid $Mg(OR^a)_x X^1_{2-x}$ obtained in step ii) with at least one activating compound selected from the group formed by activating electron donors and metal alkoxide compounds of formula $M^1(OR^b)_{v-w}(OR^3)_w$ or $M^2(OR^b)_{v-w}(R^3)_w$, to obtain a second intermediate product; wherein: $M^1$ is a metal selected from the group consisting of Ti, Zr, Hf, Al or Si; v is the valency of $M^1$; $M^2$ is a metal being Si; v is the valency of $M^2$; $R^b$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; wherein w is smaller than v, preferably v being 3 or 4;

iii) contacting the first or second intermediate reaction product, obtained respectively in step ii), with a halogen-containing Ti-compound and said compound represented Formula I, as the internal electron donor.

In a second aspect, the present invention relates to a process for preparing a procatalyst for polymerization of olefins, comprising contacting a magnesium-containing support with a halogen-containing titanium compound, and an internal electron donor according to Formula I:

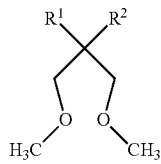

Formula I wherein $R^1$ is a secondary alkyl group and $R^2$ is a non-secondary alkyl group having at least 5 carbon atoms, preferably $R^2$ is a non-secondary alkyl group being branched at the 3-position or further positions;
said process comprising the steps of:
i) contacting a compound $R^4_z MgX^4_{2-z}$ with an alkoxy- or aryloxy-containing silane compound to give a first intermediate reaction product, being a solid $Mg(OR^a)_x X^1_{2-x}$, wherein: $R^a$ is a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; wherein $R^4$ is a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms, preferably $R^4$ is butyl; wherein $X^4$ and $X^1$ are each independently selected from the group of consisting of fluoride (F—), chloride (Cl—), bromide (Br—) or iodide (I—), preferably chloride; z is in a range of larger than 0 and smaller than 2, being $0<z<2$;
iii) contacting the first or second intermediate reaction product, obtained respectively in step i), with a halogen-containing Ti-compound and said compound represented Formula I, as the internal electron donor.

Definitions

The following definitions are used in the present description and claims to define the stated subject matter. Other terms not cited below are meant to have the generally accepted meaning in the field.

"Ziegler-Natta procatalyst" as used in the present description means: a transition metal-containing solid catalyst compound comprises catalytic species (viz. a transition metal-containing species comprises a transition metal halide selected from titanium halide, chromium halide, hafnium halide, zirconium halide and vanadium halide) supported on a metal or metalloid compound (e.g. a magnesium compound or a silica compound).

"internal electron donor" as used in the present description means: an electron-donating compound containing one or more atoms of oxygen (O) and/or nitrogen (N).

"halide" as used in the present description means: an ion selected from the group of: fluoride (F—), chloride (Cl—), bromide (Br—) or iodide (I—).

"alkyl" as used in the present description means: an alkyl group being a functional group or side-chain consisting of carbon and hydrogen atoms having only single bonds. An alkyl group may be straight or branched and may be unsubstituted or substituted.

"branched alkyl" as used in the present description means: an alkyl group having at least one branch, this are the groups discussed above for C3, C4, C5, C6, and C7 with the exception of the "n-" groups. When we state that a alkyl group is branched at the 2 position (branched at 2), it is meant that this is the second carbon atom in that specific alkyl group that is branched, whereas its first carbon atom is attached at the 2-position of the 1,3-diether. When we state that a alkyl group is branched at the 3 position (branched at 3), it is meant that this is the third carbon atom in that specific alkyl group that is branched, whereas its first carbon atom is attached at the 2-position of the 1,3-diether etc.

"secondary alkyl" as used in the present description means: an alkyl group that is attached at the 2-position of the 1,3-diether with a secondary carbon atom being a carbon atom of the alkyl group that is directly bonded to two carbon atoms.

"C3 alkyl" as used in the present description means: an alkyl group having 3 carbon atoms, being a propyl such as n-propyl or isopropyl.

"C4 alkyl" as used in the present description means: an alkyl group having 4 carbon atoms, being a butyl such as n-butyl, 2-methylpropyl (sec-butyl), 3-methylpropyl (i-butyl), t-butyl.

"C5 alkyl" as used in the present description means: an alkyl group having 5 carbon atoms, being a pentyl such as n-pentyl, 2-methylbutyl, 3-methylbutyl, 4-methylbutyl, 2-ethylpropyl, cyclopentyl, 2,3-dimethylpropyl.

"C6 alkyl" as used in the present description means: an alkyl group having 6 carbon atoms, being a hexyl such as n-hexyl, 2-methylpentyl, 3-methylpentyl, 4-methylpentyl, 5-methylpentyl, 2-ethylbutyl, 3-ethylbutyl, cyclohexyl, 2,3-dimethylbutyl, 2,4-dimethylbutyl, 3,4-dimethylbutyl.

"C7 alkyl" as used in the present description means: an alkyl group having 7 carbon atoms, being a heptyl such as n-heptyl, 2-methylhexyl, 3-methylhexyl, 4-methylhexyl, 5-methylhexyl, 6-methylhexyl 3-ethylpentyl, 4-ethylpentyl, cycloheptyl, 2,3-dimethylpentyl, 2,4-dimethylpentyl, 2,5-dimethylpentyl, 3,4-dimethylpentyl, 3,5-dimethylpentyl, 4,5-dimethylpentyl, 2-n-propylbutyl, 2-i-proylbutyl, 3-ethyl-4-methylbutyl, 2-methyl-3-ethylbutyl, 2-ethyl-3-methylbutyl.

"ambient temperature" as used in the present description means a temperature of 20° C.

"ambient pressure" as used in the present description means atmospheric pressure (atm or 101.325 kPa).

Unless stated otherwise, when it is stated that any R group is "independently selected from" this means that when several of the same R groups are present in a molecule they may have the same meaning or they may not have the same meaning.

The present invention is described below in more detail. All embodiments described with respect to one aspect of the present invention are also applicable to the other aspects of the invention, unless otherwise stated.

DESCRIPTION OF EMBODIMENTS

In an embodiment, $R^1$ is a secondary alkyl group and $R^2$ is a non-secondary alkyl group having at least 5 carbon atoms, preferably $R^2$ is a non-secondary alkyl group being branched at the 3-position or further positions.

In an embodiment, said secondary alkyl group is selected from the group consisting of isopropyl, 2-methylpropyl (sec-butyl), t-butyl, 2-methylbutyl, 2-ethylpropyl, cyclopentyl, 2,3-dimethylpropyl, 2-methylpentyl, 2-ethylbutyl, 2,3-dimethylbutyl, 2,4-dimethylbutyl, 2-methylhexyl, cyclohexyl, cycloheptyl, 2,3-dimethylpentyl, 2,4-dimethylpentyl, 2,5-dimethylpentyl, 2-n-propylbutyl, 2-i-proylbutyl, 2-methyl-3-ethylbutyl, and 2-ethyl-3-methylbutyl.

In an embodiment, during step ii) as activating compounds an alcohol is used as activating electron donor and titanium tetraalkoxide is used as metal alkoxide compound.

In an embodiment, an activator is present. In an embodiment, said activator is ethyl benzoate. In an embodiment, said activator is a benzamide according to formula X:

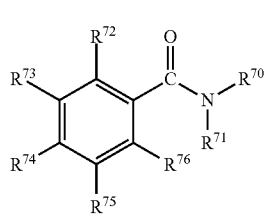

Formula X wherein $R^{70}$ and $R^{71}$ are each independently selected from hydrogen or an alkyl, and $R^{72}$, $R^{73}$, $R^{74}$, $R^{75}$, $R^{76}$ are each independently selected from hydrogen, a heteroatom or a hydrocarbyl group, preferably selected from alkyl, alkenyl, aryl, aralkyl, alkoxycarbonyl or alkylaryl groups, and one or more combinations thereof, more preferably wherein $R^{70}$ and $R^{71}$ are both methyl and wherein $R^{72}$, $R^{73}$, $R^{74}$, and $R^{75}$ are all hydrogen, being N,N'-dimethylbenzamide (Ba-2Me).

The internal electron donors according to the present invention are according to Formula I:

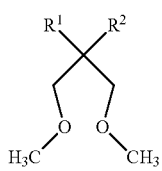

Formula I

Wherein $R^1$ and $R^2$ are each independently selected from the group consisting of alkyl groups having at least three carbon atoms (C3), preferably at most seven carbon atoms (C7), preferably at most six carbon atoms (C6) preferably iso-propyl, iso-butyl, iso-pentyl, cyclopentyl, n-pentyl, and iso-hexyl.

In a specific embodiment, the internal electron donor is 3,3-bis(methoxymethyl)-2,5-dimethylhexane], according to Formula I wherein $R^1$ is the secondary C3 alkyl iso-propyl and $R^2$ is a non-secondary iso-butyl having a branch on the second carbon atom (abbreviated as iPiB, wherein iP stands for iso-propyl and wherein iB stands for iso-butyl, also known as 2-methyl-propyl). This compound iPiB has a chemical formula of $C_{12}H_{26}O_2$; an exact mass of 202.19 and a molecular weight of 202.34. In a more specific embodiment, iPiB is used as internal donor and N,N-dimethylbenzamide is used as activator.

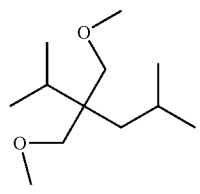

iPiB

In a specific embodiment, the internal electron donor is 5,5-bis(methoxymethyl)-2,8-dimethylnonane, according to Formula I wherein $R^1$ and $R^2$ are both iso-pentyl, both being non-secondary and having a branch on the third carbon atom (abbreviated as iPen, wherein iPen stands for iso-pentyl, also known as 3-methyl-butyl). This compound iPen has a chemical formula of $C_{15}H_{32}O_2$; an exact mass of 244.24 and a molecular weight of 244.42. In a more specific embodiment, iPen is used as internal donor and N,N-dimethylbenzamide is used as activator.

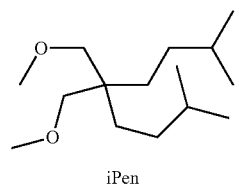 [SMILES: COCC(CCC(C)C)(CCC(C)C)COC]

iPen

In a specific embodiment, the internal electron donor is 3,3-bis(methoxymethyl)-2,6-dimethyl heptane, according to Formula I wherein $R^1$ is iso-propyl being secondary alkyl and $R^2$ is iso-pentyl being non-secondary and having a branch on the third carbon atom (abbreviated as iPiPen, wherein iP stands for iso-propyl and iPen stands for iso-pentyl, also known as 3-methyl-butyl). This compound iPiPen has a chemical formula of $C_{13}H_{28}O_2$; an exact mass of 216.21 and a molecular weight of 216.37. In a more specific embodiment, iPiPen is used as internal donor and N,N-dimethylbenzamide is used as activator.

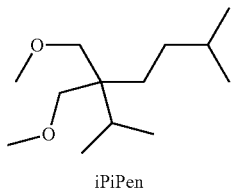

iPiPen

In a specific embodiment, the internal electron donor is 3,3-bis(methoxymethyl)-2,4-dimethyl-heptane, according to Formula I wherein $R^1$ is the secondary alkyl iso-propyl and $R^2$ is being secondary alkyl 2-pentyl (abbreviated as iP2Pen, wherein iP stands for iso-propyl and 2Pen stands for 2-pentyl). This compound iP2Pen has a chemical formula of $C_{13}H_{28}O_2$; an exact mass of 216.21 and a molecular weight of 216.37. In a more specific embodiment, iP2Pen is used as internal donor and N,N-dimethylbenzamide is used as activator.

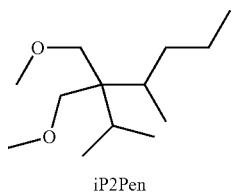

iP2Pen

In a specific embodiment, the internal electron donor is (1-methoxy-2-(methoxymethyl)-5-methylhexan-2-yl)cyclopentane, according to Formula I wherein $R^1$ is secondary alkyl cyclopentyl and $R^2$ is secondary cyclopentyl (abbreviated as CPiPen, wherein CP stands for cyclopentyl and iPen stands for iso-pentyl, also known as 3-methyl-butyl). This compound CPiPen has a chemical formula of $C_{15}H_{30}O_2$; an exact mass of 242.22 and a molecular weight of 242.40. In a more specific embodiment, CPiPen is used as internal donor and N,N-dimethylbenzamide is used as activator.

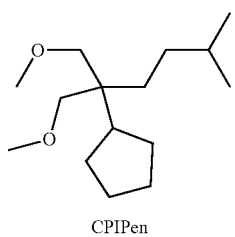 [SMILES: COCC(CCC(C)C)(COC)C1CCCC1]

CPIPen

In a specific embodiment, the internal electron donor is (1,3-dimethoxypropane-2,2-diyl)dicyclopentane according to Formula I wherein $R^1$ and $R^2$ are both secondary alkyl cyclopentyl (abbreviated as CP, wherein CP stands for cyclopentyl). This compound CP has a chemical formula of $C_{15}H_{28}O_2$; an exact mass of 240.21 and a molecular weight of 240.39 In a more specific embodiment, CP is used as internal donor and N,N-dimethylbenzamide is used as activator.

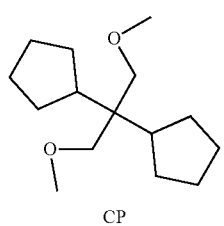

CP

In a specific embodiment, the internal electron donor is 3,3-bis(methoxymethyl)-2,7-dimethyloctane, according to Formula I wherein $R^1$ is the secondary alkyl iso-propyl and $R^2$ is non-secondary iso-hexyl with a branch on the third carbon atom (abbreviated as iPiHex, wherein iP stands for iso-propyl and iHex stands for iso-hexyl, also known as 4-methyl-pentyl). This compound iPiHex has a chemical formula of C14H30O2; an exact mass of 230.22 and a molecular weight of 230.39. In a more specific embodiment, iPiHex is used as internal donor and N,N-dimethylbenzamide is used as activator.

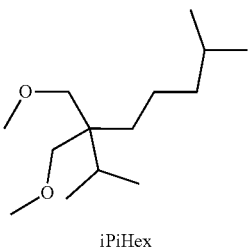 [SMILES: COCC(CCCC(C)C)(COC)C(C)C]

iPiHex

In a specific embodiment, the internal electron donor is 3,3-bis(methoxymethyl)-2-methyloctane, according to Formula I wherein $R^1$ is secondary alkyl iso-propyl and $R^2$ is non-secondary non-branched n-pentyl (abbreviated as iPnPen, wherein iP stands for iso-propyl and nPen stands for n-pentyl). This compound iPnPen has a chemical formula of $C_{13}H_{28}O_2$; an exact mass of 216.21 and a molecular weight of 216.37. In a more specific embodiment, iPnPen is used as internal donor and N,N-dimethylbenzamide is used as activator.

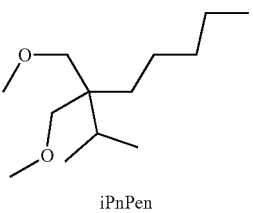

iPnPen

In a specific embodiment, the internal electron donor is 3,3-bis(methoxymethyl)-2,6-dimethyloctane, according to Formula I wherein $R^1$ is secondary alkyl iso-propyl and $R^2$ is non-secondary branched iso-hexyl having a branch at the third carbon atom (abbreviated as iPiHex, wherein iP stands for iso-propyl and wherein iHex stands for iso-hexyl, also known as 3-methyl-pentyl). This compound iPiHex has a chemical formula of $C_{14}H_{32}O_2$; an exact mass of 230.22 and a molecular weight of 230.39. In a more specific embodiment, iPiHex is used as internal donor and N,N-dimethylbenzamide is used as activator.

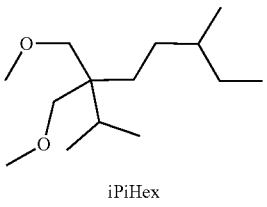 [SMILES: CCC(C)CCC(COC)(COC)C(C)C]

iPiHex

In an embodiment, the procatalyst according to the present invention provides a polymer yield of at least 50 kg polymer per gram of procatalyst used.

In an embodiment, the substituent $R^1$ is isopropyl or cyclopentyl. In an embodiment, the substituent $R^2$ is iso-pentyl or isohexyl. The below table shows the embodiments above with their abbreviations and the $R^1$ and $R^2$ groups as well if these groups are secondary or not and branched or not.

According to the present invention, it is further preferred that $R^1$ is a secondary alkyl group and $R^2$ is a non-secondary alkyl group being branched at the 3-position or further positions.

| | R¹ | | | R² | | |
|---|---|---|---|---|---|---|
| Abbrev | secondary | branched | # C | secondary | branched | # C |
| iPiB | Yes (iP) | Yes at 1 | 3 | No (iB) | Yes at 2 | 4 |
| iPen | No (iPen) | Yes at 3 | 5 | No (iPen) | Yes at 3 | 5 |
| iPiPen | Yes (iP) | Yes at 1 | 3 | No (iPen) | Yes at 3 | 5 |
| iP2Pen | Yes (iP) | Yes at 1 | 3 | Yes (2Pen) | Yes at 1 | 5 |
| CPiPen | Yes (CP) | Yes at 1 | 5 | No (iPen) | Yes at 3 | 5 |
| CP | Yes (CP) | Yes at 1 | 5 | Yes (CP) | Yes at 1 | 5 |
| iPnPen | Yes (iP) | Yes at 1 | 3 | No (nPen) | No | 5 |
| iPiHex | Yes (iP) | Yes at 1 | 3 | No (iHex) | Yes at 3 | 6 |

In an embodiment, the procatalyst according to the present invention provides a xylene soluble value of at most 4.0 wt. %, preferably at most 3.0 wt. %, more preferably at most 2.0 wt. %.

In an embodiment, the procatalyst according to the present invention provides a polymer having a CX value of at most 5.0 wt. %, preferably at most 4.0 wt. %, more preferably at most 3.0 wt. %.

In an embodiment according to the present invention, the content of internal donor is at least 8 wt. % of the total weight of the procatalyst, such as at least 9 wt. %, or at least 10 wt. % or at least 12 wt. % or at least 13 wt. %.

In an embodiment, when making the procatalyst the internal electron donor (and optionally the activator) may be added once during the procedure or may be added twice during the procedure (double-split addition). With this double-split addition, the double amount of internal electron donor (and optionally activator) is added: each time one full portion is added. This will increase the content of internal electron donor in the procatalyst and will provide for a lower CX value (better isotacticity of the polymer obtained). This also will increase the content of the activator, this increase will—according to the believes of the present inventors, although they do not want to be bound by this theory, most likely not have a significant effect on the lowering of the CX.

The process for preparing a procatalyst according to the present invention comprises the following phases:
Phase A): preparing a solid support for the procatalyst;
Phase B): optionally activating said solid support obtained in phase A) using one or more activating compounds to obtain an activated solid support;
Phase C): contacting said solid support obtained in phase A) or said activated solid support in phase B) with a catalytic species wherein phase C) comprises one of the following:
  i. contacting said solid support obtained in phase A) or said activated solid support in phase B) with a catalytic species, an activator, and one or more internal donors to obtain said procatalyst; or
  ii. contacting said solid support obtained in phase A) or said activated solid support in phase B) with a catalytic species, an activator, and one or more internal donors to obtain an intermediate product; or
  iii. contacting said solid support obtained in phase A) or said activated solid support in phase B) with a catalytic species and an activator to obtain an intermediate product;
optionally Phase D: modifying said intermediate product obtained in phase C) wherein phase D) comprises on of the following:
  i. modifying said intermediate product obtained in phase C) with a Group 13- or transition metal modifier in case an internal donor was used during phase C), in order to obtain a procatalyst;
  ii. modifying said intermediate product obtained in phase C) with a Group 13- or transition metal modifier and an internal donor in case an activator was used during phase C), in order to obtain a procatalyst.

More information about the process steps can be found in WO2015185490A1, page 32, line 22 through page 39, line 17 for Phase A, from page 39, line 18 through page 45, line 2 for Phase B, from page 45, line 4 through page 47, line 30 for Phase C, from page 47, line 32 through page 53 line 11 for Phase D. These sections are herewith incorporated by reference.

In an aspect, the invention relates to a process for preparing a polyolefin by contacting an olefin, preferably propylene, with the procatalyst according to any one of the preceding claims, a co-catalyst and optionally an external electron donor. In an aspect, the invention relates to the polyolefin, preferably polypropylene, obtained or obtainable by the process according to the invention.

The polymerization process may be a gas phase, a slurry or a bulk polymerization process, operating in one or more than one reactor. One or more olefin monomers can be introduced in a polymerization reactor to react with the procatalyst and to form an olefin-based polymer (or a fluidized bed of polymer particles).

In the case of polymerization in a slurry (liquid phase), a dispersing agent is present. Suitable dispersing agents include for example propane, n-butane, isobutane, n-pentane, isopentane, hexane (e.g. iso- or n-), heptane (e.g. iso- or n-), octane, cyclohexane, benzene, toluene, xylene, liquid propylene and/or mixtures thereof. The polymerization such as for example the polymerization temperature and time, monomer pressure, avoidance of contamination of catalyst, choice of polymerization medium in slurry processes, the use of further ingredients (like hydrogen) to control polymer molar mass, and other conditions are well known to persons of skill in the art.

Several types of polyolefins may be prepared such as homopolyolefins, random copolymers and heterophasic impact polyolefin.

The molar mass of the polyolefin obtained during the polymerization can be controlled by adding hydrogen or any other agent known to be suitable for the purpose during the polymerization. The polymerization can be carried out in a continuous mode or batch-wise. Slurry-, bulk-, and gas-phase polymerization processes, multistage processes of each of these types of polymerization processes, or combinations of the different types of polymerization processes in a multistage process are contemplated herein. Preferably, the polymerization process is a single stage gas phase process or a multistage, for instance a two-stage gas phase process, e.g. wherein in each stage a gas-phase process is used or including a separate (small) pre-polymerization reactor.

The olefin that is polymerized is propylene or a mixture of propylene and another olefin, to result in a propylene-based polymer, such as propylene homopolymer or propylene-olefin copolymer. The olefin may an α-olefin having up to 10 carbon atoms, such as ethylene, butane, hexane, heptane, octene.

A propylene copolymer is herein meant to include both so-called random copolymers which typically have relatively low comonomer content, e.g. up to 10 mol %, as well as so-called impact PP copolymers or heterophasic PP copolymers comprising higher comonomer contents, e.g. from 5 to 80 mol %, more typically from 10 to 60 mol %. The impact PP copolymers are actually blends of different propylene polymers; such copolymers can be made in one or two reactors and can be blends of a first component of low or zero comonomer content and high crystallinity, and a second component of high comonomer content having low crystallinity or even rubbery properties. Such random and impact copolymers are well-known to the skilled in the art. A propylene-ethylene random copolymer may be produced in one reactor. Impact PP copolymers may be produced in two reactors: polypropylene homopolymer or random copolymer may be produced in a first reactor; the content of the first reactor is subsequently transferred to a second reactor into which ethylene (and optionally propylene) is introduced. This results in production of a propylene-ethylene copolymer (i.e. an impact copolymer) in the second reactor.

Other variations to the disclosed embodiments can be understood and effected by those skilled in the art. In the claims, the word "comprising" does not exclude other elements or steps, and the indefinite article "a" or "an" does not exclude a plurality. The scope of the present invention is defined by the appended claims. One or more of the objects of the invention are achieved by the appended claims.

EXAMPLES

The present invention is further elucidated based on the Examples below which are illustrative only and not considered limiting to the present invention.

Preparation of Internal Donors

Example 1:
3,3'-bis(methoxymethyl)-2-methyloctane (iPnPen)

Step 1: Synthesis of diethyl-2-isopropyl Malonate

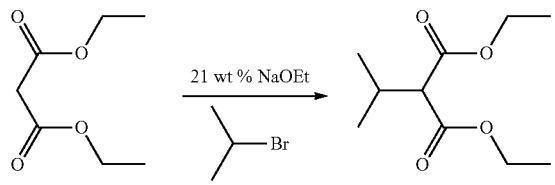

An amount of 122.5 mL of a 21 wt % sodium ethoxide solution was added to a 4-necked round bottom flask. To this, slowly, 38.5 mL of diethyl malonate was added with stirring. A thick yellow coloured precipitate separated out after which stirring became difficult (no exothermic behaviour observed). The addition of diethyl malonate was completed in 30 minutes. The resulting reaction mixture was heated to a temperature of 40° C. to 45° C. The precipitated solid dissolved and a clear dark coloured solution was obtained. At this temperature, 35.78 mL of 2-bromopropane was added slowly under stirring. During the addition, sodium bromide began to separate out. The reaction temperature was then raised to a temperature of 60° C. and maintained at 60° C. under stirring for a period of between 10 and 12 hours. To test the progress of the reaction, a small portion of the reaction mixture was worked up by adding water and extracting with ethyl acetate. The ethyl acetate layer was separated and submitted for GC & GC-MS analysis. On completion of reaction as determined by GC and GC-MS analysis, the reaction mixture was evaporated and the resulting mixture transferred to ice-cold water. Then an extraction was carried out twice, each time using 100 mL of dichloromethane. The combined dichloromethane extract was then stirred with ammonium chloride and finally dried on sodium sulphate. The dichloromethane layer was evaporated to obtained 48 g of the product. The purity of the product was confirmed by GC to be >99% and the structure was confirmed by GC-MS: M+202.

Step 2: Synthesis of diethyl-2-isopropyl-2-pentylmalonate

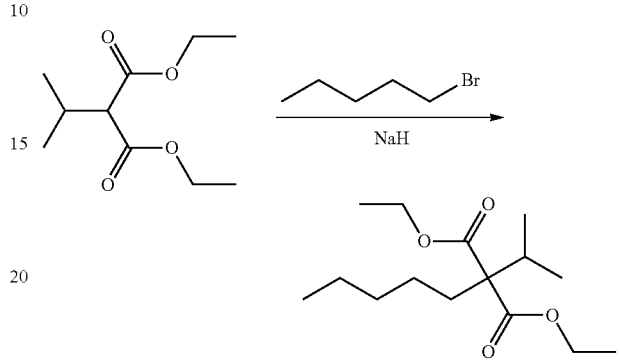

An amount 200 mL of xylene was added to a 500 mL round bottom flask. To this 9 g of 55-60 wt. % sodium hydride in paraffin oil was added (no increase in temperature is observed). The suspension obtained was stirred for 10 min after which the stirring was stopped. Thereafter, 20 gram of diethyl-2-isopropyl malonate, the product obtained in step 1, was dissolved in 50 mL of xylene and slowly added into the reaction mixture over a period of between 45 and 60 minutes at ambient temperature while controlling exothermic behaviour. Effervescence are observed. Once the addition was completed, the temperature was slowly raised over a period of 60 minutes to 85° C. controlling the strong effervescence due to exothermic behaviour. Then, reaction mixture was stirred at 85° C. (internal temperature) for a period of 30 minutes. At this temperature, 22 g of 1-bromopentane was added dropwise over a period of 15 minutes (no exothermic behaviour observed). Once, the addition was completed, the temperature was raised to 140° C. and stirred for 4 hours at this temperature. Then, the reaction mixture was stirred at ambient temperature for 12-14 hours. To test the progress of the reaction, a small portion of the reaction mixture was is taken and cooled to 10° C., ethyl acetate was added followed by methanol and then water to ensure decomposition of sodium hydride. The ethyl acetate layer was tested using GC-MS. On completion of reaction as determined by GC-MS analysis, the reaction mixture was worked up using the same procedure. The product was purified by vacuum distillation to obtain a purity of 98% as determined by GC. The structure was confirmed by GC-MS: M+272.

Step 3: Synthesis of 2-isopropyl-2-pentylpropane-1,3-diol

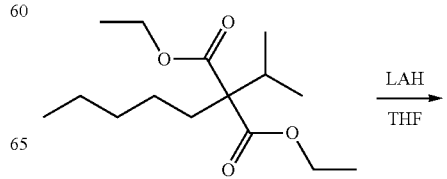

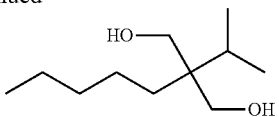

In a 500 mL four necked round bottom an amount of 3.8 gram of lithium aluminium hydride (LAH) tablets were added. To this was added 60 mL of THF and the resulting suspension was slowly stirred at ambient temperature for a period of 30 minutes. Then, the suspension was cooled to a temperature of between 15 and 20° C. after which 15 grams of the product obtained in step 2 product dissolved in 30 mL of THF was gradually (dropwise) added to the suspension over a period of 30 minutes; upon which exothermic behaviour was observed. After the addition was completed, the reaction mixture was stirred at ambient temperature for a period of between 16 and 20 hours. On completion of the reaction (based on GC analysis of a small aliquot), the reaction mixture was cooled to a temperature of between 15 and 20° C. Subsequently, a 50% v/v mixture of THF and water is gradually (dropwise) added over a period of 45 minutes in order to quench LAH, followed by gradual addition of water. A thick mass of insoluble metal hydroxides separates out after the addition of water. The reaction mixture is subsequently filtered and the filtrate comprising the product is extracted with dichloromethane. The organic layer is dried on sodium sulphate and evaporated to get the liquid product. Then 10 gram of the product is obtained having a purity of 93% as determined by GC and having a GC-MS M+ of 188 confirming the structure.

Step 4: Synthesis of 3,3-bis(methoxymethyl)-2-methyloctane

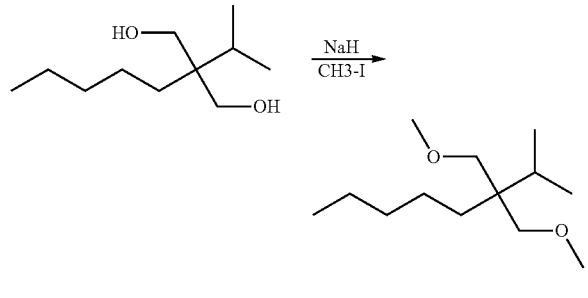

In a four necked round bottom flask, 60 mL of THF was added to which 6.2 grams of sodium hydride (NaH) was slowly added. The resulting suspension was stirred at ambient temperature for a period of 15 minutes. Then, the suspension was cooled to a temperature of between 10 and 15° C. Then a solution of 9.2 grams of the product obtained in step 3 in 60 mL of THF was gradually (dropwise) added to the suspension over period of 45 minutes. After the addition was completed, the reaction mixture was stirred at ambient temperature for a period of 2 hours. The reaction mixture was then cooled to a temperature of 10° C. Subsequently, 8 mL of methyl iodide was gradually (dropwise) added to the reaction mixture over a period of 15 minutes. A vigorous effervescence was observed with a rise in temperature of approximately 2° C. Once the addition was completed, the reaction mixture was stirred at ambient temperature for a period of 16 to 20 hours. On completion of the reaction (based on GC analysis of a small aliquot), the reaction mixture was cooled to a temperature of between 15 and 20° C. Subsequently, a mixture of 50% v/v of THF in water is gradually added to the reaction mixture over a period of 15 minutes to quench remaining NaH Extraction was done using dichloromethane as a solvent, followed by evaporation to get a liquid compound. Finally, the product obtained is purified using vacuum distillation to obtain an amount of 5 grams of the product with a purity of >98% as determined by GC. The structure of the compound was confirmed by GC-MS: M+216 as well as 1H-NMR (300 MHz) in CDCl$_3$: δ0.8-1.17 (9H's, —2CH$_3$ & CH$_3$); δ1.2-1.5(8H's, —4CH$_2$); δ1.8(1H, —CH-isopropyl); δ 3.1-3.2 (10H's, —2CH$_2$ & —2OCH$_3$).

Example 2: Synthesis of 3,3'-bis(methoxymethyl)-2,7-dimethyl Octane (IPiHEX)

Step 1: Synthesis of Diethyl 2-isopropyl Malonate

The process as used in Example 1 was repeated.

Step 2: Synthesis of diethyl 2-isopropyl-2-(4-methylpentyl) Malonate

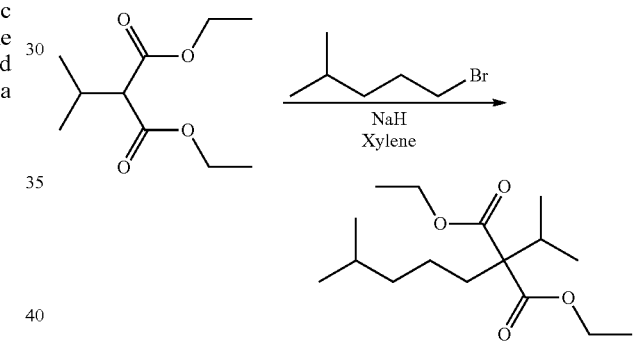

The same procedure as in step 2 of example 1 was used with the exception that instead of 1-bromopentane 1-bromo-4-methyl pentane was used. The product was purified by vacuum distillation to obtain a purity of 92% as determined by GC. The structure was confirmed by GC-MS: M+286.

Step 3: Synthesis of 2-isopropyl-2-(4-methylpentyl) propane-1,3-diol

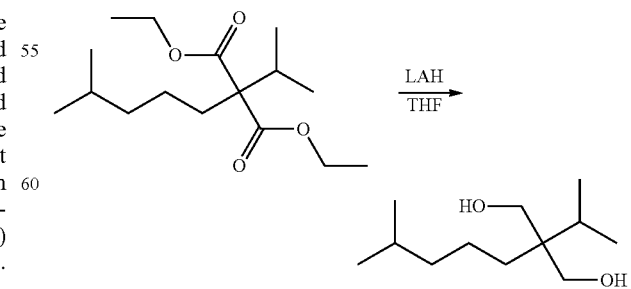

The same procedure as in step 3 of example 1 was used with the exception that instead of the product obtained in step 2 of Example 1, the product obtained in step 2 of Example 2 was used. Ten gram of the product is obtained having a purity of 95% as determined by GC and having a GC-MS M+ of 202 confirming the structure.

Step 4: Synthesis of 3,3-bis(methoxymethyl)-2,7-dimethyloctane

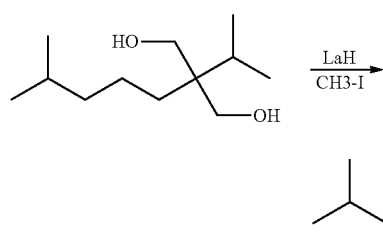

The same procedure as in step 4 of example 1 was used with the exception that instead of the product obtained in step 3 of Example 1, the product obtained in step 3 of Example 2 was used. Five 5 grams of the product was obtained with a purity of >93% as determined by GC. The structure was confirmed by GC-MS: M$^+$230 as wells as 1H-NMR (300 MHZ) in CDC$_3$: δ0.8 (6H's, —2CH3-isopropyl); δ1.17-1.19 (6H's, —3CH$_2$); δ1.23 (1H's, —CH-isopentyl); □1.35 (1H's, —CH-isopropyl); δ 3.1-3.2 (10H's, —2CH$_2$ & —2OCH$_3$).

Example 3: Synthesis of 3,3-bis(methoxymethyl)-2,6-dimethyl Octane (iPiHex)

Step 1a: Synthesis of Diethyl 2-isopropyl Malonate

The process as used in Example 1 was repeated.

Step 1b: Synthesis of 3-methyl-1-bromopentane from 3-methyl-1-pentanol

In order to prepare the brominated alkane product, step 1b is carried out as follows. In a four necked round bottom flask 30.37 mL of 3-methyl -1-pentanol was added and cooled in a mixture of ice and salt to a temperature between 0 and 10° C. Then, gradually 26.98 mL of phosphorus tribromide (PBr$_3$) was added over a period of 45 minutes using an addition funnel upon which exothermic behaviour was observed. The temperature is maintained around 0° C. Once, the addition is completed, the cooling bath is removed and the resulting mixture is allowed to stir for 12 hours while warming up to ambient temperature. Then the stirring is stopped and the reaction mixture is allowed to stand for 5 hours at ambient temperature to form two layers. The reaction mixture is again cooled to a temperature of between 0 and 10° C. A saturated solution of potassium carbonate was prepared and slowly added to the reaction mixture in order to quench the acid present in the reaction mixture; a strong effervescence was observed. The addition was halted when the reaction mixture was neutral (monitored on pH paper). Then, the reaction mixture is allowed to stand for a period of 2 hours and separation into two layers was observed. The organic product layer was separated and washed thoroughly with water; and dried on sodium sulphate. After 1 hours, the sodium sulphate was removed by filtering through filter paper to get a very clear product layer. The product was obtained in an amount of 26 grams with a purity of 91% as determined by GC. The structure was confirmed by GC-MS: M$^+$230.

Step 2: Synthesis of Diethyl 2-isopropyl-2-(3-methylpentyl) Malonate

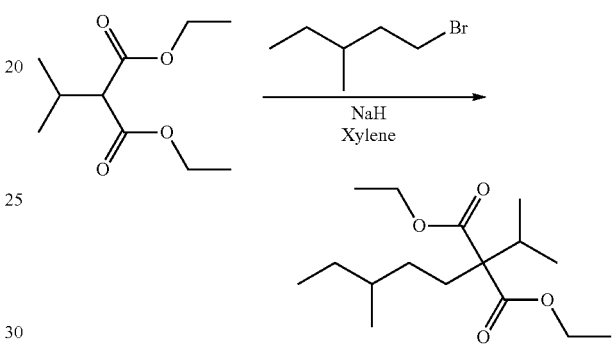

The procedure according to step 2 of example 1 was used, with the following differences. An amount 150 mL of xylene was used instead of 200 ml. The product obtained in step 1b of Example 3 was used instead of the product obtained in step 1 of Example 1. 19.5 grams of 3-methyl-1-bromopentane obtained in step 1 b was used instead of 22 g of 1-bromopentane which is used in Example 1. The product was purified by vacuum distillation to obtain a purity of 94% as determined by GC. The structure was confirmed by GC-MS: M$^+$286.

Step 3: Synthesis of 2-isopropyl-2-(3-methylpentyl) propane-1,3-diol

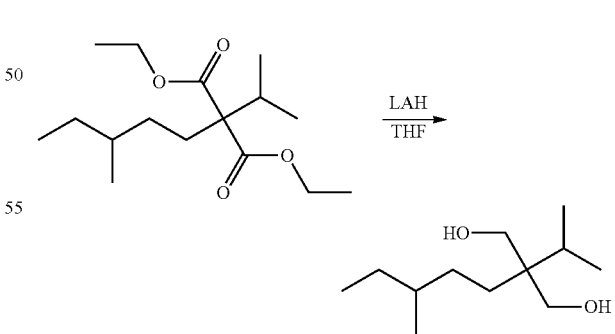

The same procedure as in step 3 of example 1 was used with the exception that instead of the product obtained in step 2 of Example 1, the product obtained in step 2 of Example 3 was used. Ten gram of the product is obtained having a purity of 90% as determined by GC and having a GC-MS M+ of 202 confirming the structure.

Step 4: Synthesis of 3,3-bis(methoxymethyl)-2,6-dimethyloctane

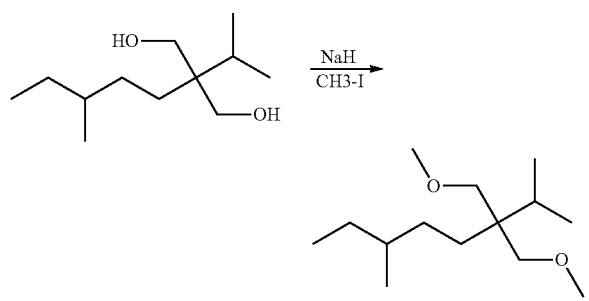

The procedure of step 4 of Example 1 was followed with the following exceptions. Instead of 60 mL THF, 120 mL was used. The product obtained in step 3 of Example 3 was used instead of the product obtained in step 3 of Example 1. An amount of 5 grams of the product with a purity of 94% as determined by GC. The structure of the compound was confirmed by GC-MS: M+202 as well as 1H-NMR (300 MHz) in CDCl$_3$: δ0.82-0.89 (6H's, —2CH$_3$-isopropyl; 3H, —CH$_3$ & 3H, —CH3-chain); δ1.2-1.5 (6H's, —3CH$_2$; 1H, —CH); δ1.8 (1H's, —CH—); δ 3.24-3.28 (8H's, —2CH$_2$ & —2OCH$_3$).

Example 4: Synthesis of 3,3-bis(methoxymethyl)-2,6-dimethyl Heptane (iPiPen)

Step 1: Synthesis of Diethyl 2-isopropyl Malonate

The same procedure as in step 1 of Example 1 is followed.

Step 2: Synthesis of Diethyl 2-isopentyl-2-isopropyl Malonate

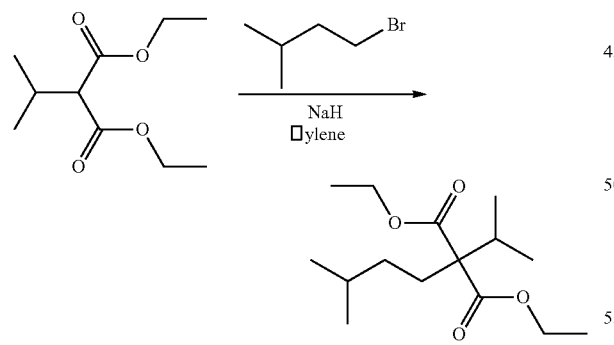

A dry, 2000 ml, three necked round bottom flask equipped with a mechanical stirrer, a pressure-equalizing dropping funnel, and a thermometer was charged with 400 mL of xylene. Then 25.2 grams of 60% of sodium hydride in paraffin oil was added using an addition funnel. The residual sodium hydride in the funnel was washed into the reaction mixture with 100 ml of xylene. A solution of 60 grams of the product obtained in step 1 of Example 1 in 100 ml of xylene was gradually added using an addition funnel over a period of 30 minutes. Then, the temperature was raised to 30° C., and effervescence was observed. Then, the reaction temperature suddenly increased after some time with strong effervescence/frothing until the flask was almost filled. The reaction mixture was stirred for a period 60 minutes at ambient temperature. Afterwards, the temperature was raised slowly raised over a period of 60 minutes to a temperature of 85° C. A cooling system was ready in case the reaction because too vigorous. Frothing is observed due to the formation of the sodium salt of the product obtained in step 1 of Example 4. The reaction mixture is then stirred at a temperature of 85° C. for a period of 1 hour. At this temperature, 39 grams of isopentyl bromide (half of the total amount) was added dropwise over a period of 15 minutes (no temperature increase observed). Then, the reaction mixture was heated to a temperature of between 130° C. to 132° C., and stirred at that temperature of 3 hours. Then, the reaction mixture was cooled to 100° C. and the remaining portion of 39 grams of isopentyl bromide was added. Then, the reaction mixture was heated to a temperature of between 130° C. to 132° C., and stirred at that temperature of 16 hours; while the formation of a white precipitate was noticed. The conversion of the reaction was followed with GC by taking a aliquot of 2 ml and dumping onto ice-cold water, followed by extraction with ethyl acetate. A conversion of between 90% and 96% was obtained, as indicated by GC. The crude product obtained was distilled to remove paraffin oil impurities resulting from sodium hydride. The boiling point of the product was 90° C. and 100° C. at 0.85 mbar. An amount of quantity 58.9 grams of product was obtained, giving a yield of 73% having purity as determined by GC of 96.43%. The structure was confirmed by 1H NMR (300 MHz, CDCl3) δ 0.89 (d, J=6 Hz, 6H), 0.98 (d, J=6 Hz, 6H), 1.27 (t, J=6 Hz, 6H), 1.75 (m, 1H), 1.89 (m, 2H), 2.33 (m, 1H), 1.86 (m, 4H), 4.19 (q, J=6 Hz, 4H); and by 13C NMR (75 MHz, CDCl3) δ171.31, 61.57, 60.57, 33.34, 31.58, 31.43, 28.45, 22.45, 18.58 and 14.17; as well as GC-MS: m/e calculated for O15H28O4 was 272.39; observed was 273.23.

Step 3: Synthesis of 2-isopentyl-2-sopropyl propane-1,3-diol

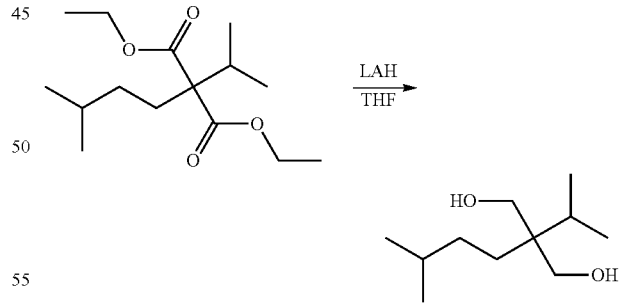

An amount of 350 ml of THF was added to a 1 L four necked round bottom flask at 25° C. to which 12.2 grams of lithium aluminum hydride (LAH) pellets were added over a period of 15 minutes, during which the temperature rose by 10° C. A turbid solution was obtained and the reaction mixture was stirred for 15 minutes while the temperature of the reaction mixture dropped to 31° C. To this reaction mixture was added dropwise over a period of 2.5 hours a solution of 50 grams of the product obtained in step 2 of Example 4 in 150 ml of toluene. The temperature increased to 39° C. after 5 minutes, and increased to 52° C. after 20 minutes. An external cooling bath can be used if the temperature would reach 60° C. The reaction mixture is then stirred at ambient temperature for 16 hours. The conversion of the reaction was followed with GC by taking a aliquot of 2 ml and dumping onto ice-cold water, followed by extraction with ethyl acetate. This revealed the remaining presence of 5-8% of the reaction product obtained in step 2 of Example 4. The reaction mixture was then heated to a temperature of 50° C. and stirred for 3 hours, which completed the reaction. Evaporation of the organic solvents on a rotary evaporating device afforded a crude viscous liquid as product in an amount of 30.5 gram providing a yield of 88% having a purity as determined by GC of 95.59%. The structure was confirmed by NMR. 1H NMR (300 MHz, CDCl3) δ 0.86 (m, 12H), 0.99-1.50 (m, 5H), 1.79-1.88 (m, 1H), 3.02 (bs, 2H), 3.53-3.72 (m, 4H); 13C NMR (75 MHz, CDCl3) δ 68.19, 42.14, 32.06, 29.06, 28.19, 27.03, 22.65, 17.15.

Step 4: Synthesis of 3,3-bis(methoxymethyl)-2,6-dimethylheptane

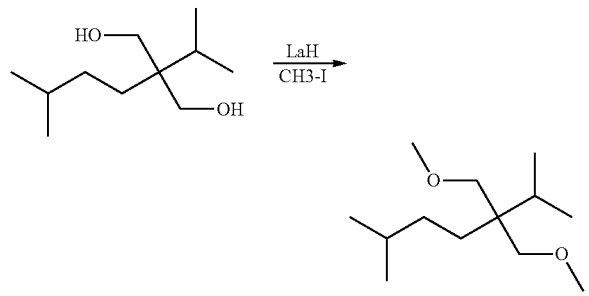

A dry, 1000 ml, four necked round bottom flask equipped with a mechanical stirrer, a pressure-equalizing dropping funnel, and a thermometer was charged with 150 ml of THF. Then, 12,4 gram of 60% of sodium hydride in paraffin oil at a temperature of 10° C. was added using an addition funnel. The residual sodium hydride in the funnel was washed with 50 ml of THF into the reaction mixture. Then, 20 grams of the product obtained in step 3 of Example 4 was dropwise added using an addition funnel over a period of 60 minutes. During the addition, the temperature increased from 17° C. to 21° C., and effervescence was observed. In addition, frothing was observed due to the formation of the disodium salt of the product obtained in step 3 of example 4; the froth filling the flask to approximate ¾ of its capacity, resulting in difficulty in stirring. To this reaction mixture, the first half portion (18.5 grams) of methyl iodide was added dropwise over a period of 15 minutes. During this time, the temperature increased from ambient temperature to 43° C. and stirring became more easy. Due to a sudden raise in temperature, a mild reflux was observed of methyl iodide at a temperature of 42° C. The, the remaining half portion of methyl iodide (18.5 g) was added dropwise over a period of 15 minutes during which time no increase in temperature was observed. The exothermic behaviour during the addition of methyl iodide can be controlled by using external cooling to keep the temperature of the reaction mixture at 30° C. The reaction mixture is subsequently stirred at ambient temperature for a period of 16 hours during which the formation of a white precipitate was observed. The conversion of the reaction was followed with GC by taking a aliquot of 2 ml and dumping onto ice-cold water, followed by extraction with ethyl acetate. This revealed the remaining presence of 5-8% of the reaction product obtained in step 3 of Example 4. Evaporation of the organic solvents on a rotary evaporating device afforded a crude viscous liquid which was distilled providing the product at a temperature of 80° C.-82° C. at 6 mbar in a quantity of 17.5 g in a yield of 76% having a purity as determined by GC of 97.69%. The structure was confirmed by NMR and GC-MS. 1H NMR (300 MHz, CDCl3) δ 0.88-0.92 (m, 12H), 1.12-1.18 (m, 2H), 1.28-1.38 (m, 2H), 1.40-1.50 (m, 1H), 1.73-1.82 (m, 1H), 3.26 (m, 4H), 3.31 (s, 6H); 13C NMR (75 MHz, CDCl3) δ 75.58, 59.10, 42.44, 32.58, 30.55, 29.32, 29.02, 22.74, 17.79; GC-MS; m/e calculated for $C_{13}H_{28}O_2$, 216.37; observed: 216.56.

Example 5: Synthesis of 1-methyoxy-2-(methoxymethyl)-5-methylhexan-2-yl)cyclopentane (CPiPEN)

Step 1: Synthesis of Diethyl 2-cyclopentyl Malonate

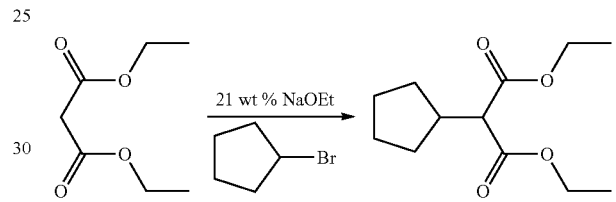

To a three necked round bottom flask fitted with a reflux condenser, an addition funnel with pressure equalizer and an overhead mechanical stirrer was added sodium ethoxide in ethanol (143 ml, 21 wt. %, 0.38 mole, light brown liquid). The addition funnel was washed with 30 ml of dry ethanol which was added to the reaction mixture. To this suspension was dropwise added 50 grams of diethylmalonate (0.312 mole) over a period of 30 minutes. Then, the reaction mixture was stirred for 30 minutes during which a solid pale yellow precipitate of sodium salt of diethylmalonate was formed. After this, stirring became difficult. To this mixture was dropwise added 58 grams of cyclopentyl bromide (44.27 ml, 0.389 mole) over a period of 30 minutes. The reaction mixture was heated to a temperature of between 77° C. and 79° C., and maintained at that temperature for a period of 18 hours. The reaction mixture was transferred to a Buchi flask and 70 ml of ethanol was removed under vacuum. The crude product obtained was poured into a beaker containing 400 ml of water, which water was then extracted with 3 portions of each 150 ml of ethyl acetate. The organic extract comprising the product was washed with twice with 50 ml of water until the pH was 7, twice with 50 ml of brine and then dried over anhydrous sodium sulphate. The organic solvent of the organic layer was removed by rotary evaporation, and the crude product obtained (59.7 g) was distilled to collect four fractions. Fraction 1: (4.5 g, boiling point of 65° C. to 97° C. at 13.9 mbar), being 38.28%. Fraction 2: (6.2 g, boiling point of 98° C. to 106° C. at 11 mbar) being the product having a purity of 74.31%. Fraction 3: (35.6 g, boiling point of 108° C.-117° C. at 11 mbar), being the product having a purity of 95.37%. Fraction 4: (10.2 g, boiling point of 117° C. to 120° C. at 13 mbar) being the product having a purity of 98.27%. Fraction 3 and fraction 4 were combined to get pure product (45.8 g, 65% yield) which was characterized by GC, GC-MS, 1H NMR and 13C NMR.GC: RT, 13.18. GC-MS: m/z calculated: 228.29; observed: 228.97 (M+H)+. Mol. Form.: C12H20O4. 1H NMR (600 MHz, CDCl3): δ4.15 (q, J=6 Hz, 4H, —OCH2), δ 3.13 (d, J=12 Hz, 1H, —CO—CH—CO), δ 2.25 (d, J=12 Hz, 1H, —CH2-CH—CH2), δ 1.23 (t, J=6 Hz, 6H, —(CH3)2CH2). 13C NMR (75 MHz, CDCl3) δ 169.03, 61.04, 57.39, 39.52, 30.69, 24.88, 14.04.

Step 2: Synthesis of Diethyl 2-cyclopentyl-2-isopentylmalonate

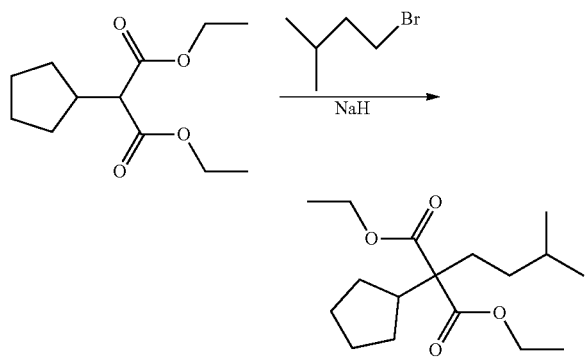

To a three necked round bottom flask fitted with a reflux condenser, an addition funnel with pressure equalizer and an overhead mechanical stirrer was added 11 grams of 50% sodium hydride in paraffin oil (0.229 mole) in xylene (200 ml). To this suspension was dropwise added 30 grams of the product obtained in step 1 of Example 5 (0.131 mole) over a period of about 15 minutes. The addition funnel was washed with 100 ml of xylene. Effervescence was observed. The reaction mixture was heated to a temperature of 85° C. and stirred at that temperature for one hour, followed by the dropwise addition of 35 grams of isopentyl bromide (0.231 mole) over a period of 15 minutes. The reaction mixture was heated to a temperature of 140° C. and maintained at that temperature for a period of 18 hours. Then, the reaction mixture was cooled to a temperature of between 0° C. and 5° C., and 15 ml of methanol was dropwise added over a period of 45 minutes. The resulting reaction mixture was then poured into a mixture of ice (200 g), water (100 ml), and ethyl acetate (100 ml) in a beaker. Two layers separated and the aqueous layer extracted twice with 100 ml of ethyl acetate. The organic layer was washed twice with water (50 ml each, pH 10), once with aqueous ammonium chloride solution (25 ml, pH 6 to 7), and twice with water (50 ml each), and twice with brine (25 ml each) and dried over anhydrous sodium sulphate. The organic product containing filtrate was evaporated using a rotary evaporator, and a liquid compound was obtained (crude yield, 82%) and characterized by GC, GC-MS, 1H NMR and 13C NMR. GC: RT, 16.22, and purity, 94.17% (GC, area %). GC-MS: m/z calculated: 298.42; observed: 299.00 (M+H)+. Mol. Form.: C17H30O4. 1H NMR (300 MHz, CDCl3): δ4.15 (m, 4H, —OCH2-CH3), δ 2.4 (m, 1H, cyclopentyl —CH), δ 1.24 (m, 6H, (CH3)2CH), δ 0.87 (m, J=6H, —CH3-CH2). 13C NMR (75 MHz, CDCl3) δ 171.65, 60.63, 60.46, 42.72, 33.42, 32.38, 28.44, 27.97, 25.30, 22.46, 14.14.

Step 3: Synthesis of 2-Cyclopentyl-2-isopentyl propane-1,3-diol

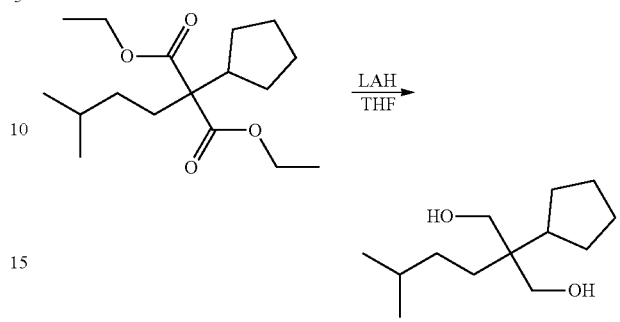

To a three-necked round bottom flask fitted with a reflux condenser, an addition funnel with pressure equalizer and an overhead mechanical stirrer was added 225 ml of dry THF. Then, 7.1 grams of LAH pellets (0.186 mole, each pellets ~0.5 g) was added using an addition funnel for solids. Then a solution of 32 grams of the product obtained in step 2 of example 5 (0.107 mole) in 95 ml of toluene was added dropwise over a period of 60 minutes. During the addition, the temperature increased from ambient temperature to 45° C. The reaction mixture was stirred for 19 hours at a temperature between 23 and 26° C. and heated to 60° C. and stirred for 3 hours. The reaction mixture was cooled to 10° C. and ethyl acetate (10 ml) added dropwise over a period of 30 minutes, and then stirred for 30 minutes. Then, dilute HCl (65 ml, 10%, to a final pH ~6) was added followed by water (200 ml) and toluene (150 ml). Two layers separated and they aqueous layer was extracted twice with toluene (100 ml each), and the combined organic layer was washed twice with water (50 ml each), brine solution and dried over dry sodium sulfate. The obtained viscous product (26 g) was purified by vacuum distillation. The colorless liquid is characterized by GC, GC-MS, 1H NMR, 13C NMR. GC: RT, 16.1646, 95.86%. GC-MS: m/z calculated: 214.35; observed: 215.03 (M+H)+. Mol. Form.: C13H26O2. 1H NMR (300 MHz, CDCl3): δ 3.697 (AB quartet, J=12 Hz, 4H, —OCH2), δ 2.76 (s, 2H, —OH), δ 0.891 (d, J=6 Hz, 6H, —(CH3)2CH). 13C NMR (75 MHz, CDCl3) δ 68.75, 42.03, 41.78, 32.25, 29.04, 28.32, 26.25, 25.13, 22.70.

Step 4: Synthesis of (1-methoxy-2-(methoxymethyl)-5-methyl hexan-2-yl) Cyclopentane (CPiPEN)

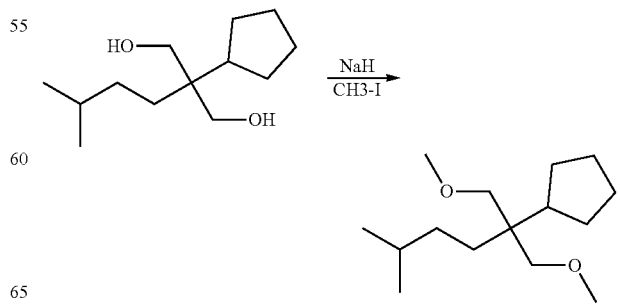

To a three necked RB flask fitted with a reflux condenser, an addition funnel with pressure equalizer and an overhead mechanical stirrer was added 7.4 grams of 50% sodium hydride in paraffin oil (0.154 mole), and tetrahydrofuran (THF, 100 ml). To this suspension was added a solution of 12 grams of the product obtained in step 3 of example 5 (0.055 mole) in 20 ml of THF dropwise over a period of 15 minutes; during which the rate of addition was adjusted in such a way as to minimize effervescence. Then, the reaction mixture was stirred at a temperature between 23° C. and 25° C. for 30 minutes. Then, 22 grams of methyl iodide (9.6 ml, 0.154 mole) was added dropwise over a period of 15 minutes; the color of reaction mixture changed from ash color to white. After the addition was completed, the reaction mixture was stirred at a temperature of between 23° C. and 25° C. for a period of 18 hours. The reaction mixture was heated to 60° C. and stirred for 3 hours. The conversion as determined by GC was shown to be >99%. The reaction mixture was cooled to 0° C.-5° C., and then methanol (15 ml) added dropwise over a period of 45 minutes. The resulting reaction mixture was poured into a mixture of ice (100 g), water (100 ml), and ethyl acetate (100 ml) in a beaker. Two layers separated and the aqueous layer was extracted twice with ethyl acetate (100 ml each). The combined organic layer was washed with water (100 ml), aqueous ammonium chloride solution (25 ml, pH 6), water (100 ml), brine (25 ml) and dried over anhydrous sodium sulfate. The organic product comprising filtrate was evaporated using rotary evaporator to afford a viscous crude product (17.9 g) that was purified by vacuum distillation. The purity determined by GC analysis was found to be 99.3%; GC-MS: m/z calculated: 242.4; found: 243.02 (M+H)+. Mol. Form.: C15H30O2. 1H NMR (300 MHz, CDCl3): δ 3.27 (s, 6H, —OCH3) 3.24-3.27 (m, 4H, —OCH2), δ 1.80-1.90 [m, 1H, —CH(CH3)2), δ 1.47-1.63 [m, 8H, —CH2-CH2], δ0.86 and 0.87 (2s, 6H, —(CH3)2CH). 13C NMR (75 MHz, CDCl3) δ 76.14, 59.09, 44.12, 41.87, 32.61, 30.31, 28.97, 26.76, 24.92, 22.69.

Preparation of Procatalyst

Butyl-Support Preparation

A stirred flask, fitted with a reflux condenser and a funnel, was filled with magnesium powder (24.3 g). The flask was brought under nitrogen. The magnesium was heated at 80° C. for 1 hour, after which dibutyl ether (150 ml), iodine (0.03 g) and n-chlorobutane (4 ml) were successively added. After the colour of the iodine had disappeared, the temperature was raised to 80° C. and a mixture of n-chlorobutane (110 ml) and dibutyl ether (750 ml) was slowly added for 2.5 hours. The reaction mixture was stirred for another 3 hours at 80° C. Then the stirring and heating were stopped and the small amount of solid material was allowed to settle for 24 hours. By decanting the colourless solution above the precipitate, a solution of butylmagnesiumchloride with a concentration of 1.0 mol Mg/l was obtained.

This step is carried out as described in Example XX of EP 1 222 214 B1, except that the dosing temperature of the reactor is 35° C., the dosing time is 360 min and the propeller stirrer w is as used. An amount of 250 ml of dibutyl ether is introduced to a 1 liter reactor. The reactor is fitted by propeller stirrer and two baffles. The reactor is thermostated at 35° C.

The solution of reaction product of step A (360 ml, 0.468 mol Mg) and 180 ml of a solution of tetraethoxysilane (TES) in dibutyl ether (DBE), (55 ml of TES and 125 ml of DBE), are cooled to 10° C., and then are dosed simultaneously to a mixing device of 0.45 ml volume supplied with a stirrer and jacket. Dosing time is 360 min. Thereafter the premixed reaction product A and the TES-solution are introduced to a reactor. The mixing device (minimixer) is cooled to 10° C. by means of cold water circulating in the minimixer's jacket. The stirring speed in the minimixer is 1000 rpm. The stirring speed in reactor is 350 rpm at the beginning of dosing and is gradually increased up to 600 rpm at the end of dosing stage.

On the dosing completion the reaction mixture is heated up to 60° C. and kept at this temperature for 1 hour. Then the stirring is stopped and the solid substance is allowed to settle. The supernatant is removed by decanting. The solid substance is washed three times using 500 ml of heptane. As a result, a pale yellow solid substance, reaction product B (the solid first intermediate reaction product; the support), is obtained, suspended in 200 ml of heptane. The average particle size of support is 22 μm and span value (d90–d10)/d50=0.5.

Support activation was carried out as described in Example IV of WO/2007/134851 to obtain the second intermediate reaction product. In inert nitrogen atmosphere at 20° C. a 250 ml glass flask equipped with a mechanical agitator is filled with slurry of 5 g of reaction product B dispersed in 60 ml of heptane. Subsequently a solution of 0.22 ml ethanol (EtOH/Mg=0.1) in 20 ml heptane is dosed under stirring during 1 hour. After keeping the reaction mixture at 20° C. for 30 minutes, a solution of 0.79 ml titanium tetraethoxide (TET/Mg=0.1) in 20 ml of heptane was added for 1 hour. The slurry was slowly allowed to warm up to 30° C. for 90 min and kept at that temperature for another 2 hours. Finally the supernatant liquid is decanted from the solid reaction product (the second intermediate reaction product; activated support) which was washed once with 90 ml of heptane at 30° C.

The activated support, according to chemical analysis, comprises a magnesium content of 17.3 wt. %, a titanium content of 2.85 wt. %, and a chloride content of 27.1 wt. % corresponding to a molar ratio of Cl/Mg of 1.07 and Ti/Mg of 0.084.

Phenyl-Support Preparation

This step was carried out as described in Example XVI of EP 1 222 214 B1.

A stainless steel reactor of 9 l volume was filled with magnesium powder 360 g. The reactor was brought under nitrogen. The magnesium was heated at 80° C. for 1 hour, after which a mixture of dibutyl ether (1 liter) and chlorobenzene (200 ml) was added. Then iodine (0.5 g) and n-chlorobutane (50 ml) were successively added to the reaction mixture. After the colour of the iodine had disappeared, the temperature was raised to 94° C. Then a mixture of dibutyl ether (1.6 liter) and chlorobenzene (400 ml) was slowly added for 1 hour, and then 4 liter of chlorobenzene was slowly added for 2.0 hours. The temperature of reaction mixture was kept in interval 98-105° C. The reaction mixture was stirred for another 6 hours at 97-102° C. Then the stirring and heating were stopped and the solid material was allowed to settle for 48 hours. By decanting the solution above the precipitate, a solution of phenylmagnesiumchloride reaction product A has been obtained with a concentration of 1.3 mol Mg/l. This solution was used in the further catalyst preparation.

This step was carried out as described in Example XX of EP 1 222 214 B1, except that the dosing temperature of the reactor was 35° C., the dosing time was 360 min and the propeller stirrer was used. 250 ml of dibutyl ether was introduced to a 1 liter reactor. The reactor was fitted by propeller stirrer and two baffles. The reactor was thermostated at 35° C.

The solution of reaction product of step A (360 ml, 0.468 mol Mg) and 180 ml of a solution of tetraethoxysilane (TES) in dibutyl ether (DBE), (55 ml of TES and 125 ml of DBE), were cooled to 10° C., and then were dosed simultaneously to a mixing device of 0.45 ml volume supplied with a stirrer and jacket. Dosing time was 360 min. Thereafter the premixed reaction product A and the TES-solution were introduced to a reactor. The mixing device (minimixer) was cooled to 10° C. by means of cold water circulating in the minimixer's jacket. The stirring speed in the minimixer was 1000 rpm. The stirring speed in reactor was 350 rpm at the beginning of dosing and was gradually increased up to 600 rpm at the end of dosing stage.

On the dosing completion the reaction mixture was heated up to 60° C. and kept at this temperature for 1 hour. Then the stirring was stopped and the solid substance was allowed to settle. The supernatant was removed by decanting. The solid substance was washed three times using 500 ml of heptane. As a result, a pale yellow solid substance, reaction product B (the solid first intermediate reaction product; the support), was obtained, suspended in 200 ml of heptane. The average particle size of support was 22 μm and span value (d90−d10)/d50=0.5.

In inert nitrogen atmosphere at 20° C. a 250 ml glass flask equipped with a mechanical agitator is filled with slurry of 5 g of reaction product B dispersed in 60 ml of heptane. Subsequently a solution of 0.22 ml ethanol (EtOH/Mg=0.1) in 20 ml heptane is dosed under stirring during 1 hour. After keeping the reaction mixture at 20° C. for 30 minutes, a solution of 0.79 ml titanium tetraethoxide (TET/Mg=0.1) in 20 ml of heptane was added for 1 hour.

The slurry was slowly allowed to warm up to 30° C. for 90 min and kept at that temperature for another 2 hours. Finally the supernatant liquid is decanted from the solid reaction product (the second intermediate reaction product; activated support) which was washed once with 90 ml of heptane at 30° C.

Example 1 and Example 14

1) TiCl$_4$ (250 mL) was added to the reactor and heated to 100° C. while stirring at 400±20 rpm. 2) butyl-support (11 g) in heptane (total volume=30 mL) was added to the reactor while stirring. 3) The reactor temperature was raised to 110° C. within 10 minutes. 4) N,N'-dimethylbenzamide (BA/Mg=0.15, 11.4174 mmol, 1.71 gram) in 3 mL of chlorobenzene followed by iPiPen (ID/Mg=0.10, 7.6116 mmol, 1.64 gram) in 2 mL of chlorobenzene were introduced. 5) The reactor temperature was raised to 115° C. within 15 minutes. 6) The mixture was stirred at 115° C. for 105 minutes. 7) The supernatant fluid was decanted after settling 5 minutes. 8) The solid residue was washed with chlorobenzene (250 mL) at 100° C. for 15 minutes. 9) The supernatant fluid was decanted after settling. 10) A mixture of TiCl$_4$ (125 mL) and chlorobenzene (125 mL) was added and heated up to 115° C.; the temperature was kept for 30 minutes under stirring. 11) The supernatant fluid was decanted after settling. 12) The steps 10) and 11) were repeated three times. 13) The solid residue was washed with heptane (5×200 mL) at decreasing temperatures, with the heat source removed completely. 14) The procatalyst was transferred into a three-necked flask in a heptane slurry and dried by a nitrogen flow (yield: 5.6 gram).

Example 2 and Example 15

Steps 1-14 according to Example 1 were repeated. In step 4) CPiPen (ID/Mg=0.10, 7.6116 mmol, 1.85 gram) was added instead of iPiPen (yield: 5.8 gram).

Example 3 and Example 16

Steps 1-14 according to Example 1 were repeated. Half the amounts were used of the support, activator, internal donor, TiCl$_4$ and chlorobenzene. In step 4) iPiHex (ID/Mg=0.10, 3.8058 mmol, 0.88 gram) was used instead of iPiPen (yield: 2.2 gram).

Example 4 and Example 17

Steps 1-14 according to Example 1 were repeated. Half the amounts were used of the support, activator, internal donor, TiCl$_4$ and chlorobenzene. In step 4) iPnPen (ID/Mg=0.10, 3.8058 mmol, 0.82 gram) (yield: 2.3 gram).

Example 5

Steps 1-14 according to Example 1 were repeated. Half the amounts were used of the support, activator, internal donor, TiCl$_4$ and chlorobenzene. In step 4) iPiHex (ID/Mg=0.10, 3.8058 mmol, 0.88 gram) (yield: 2.5 gram).

Example 6

Steps 1-14 according to Example 1 were repeated. The addition of activator and internal donor was doubled, there was twice an addition, once in step 4 as disclosed in Example 1 and once in step 10, where N,N'-dimethyl benzamide (BA/Mg=0.15, 11.4174 mmol, 1.71 g) in 3 mL of chlorobenzene, followed by IPIPEN3 (ID/Mg=0.10, 7.6116 mmol, 1.64 g) in 2 mL of chlorobenzene was introduced at 110° C. The last repetition of steps 10) and 11) is carried out at 120° C. instead of 115° C. (yield: 6.2 g).

Example 7

Steps 1-14 according to Example 2 were repeated. The addition of activator and internal donor was doubled, there was twice an addition, once in step 4 as disclosed in Example 2 and once in step 10, where N,N'-dimethyl benzamide (BA/Mg=0.15, 11.4174 mmol, 1.71 g) in 3 mL of chlorobenzene, followed by CPIPEN3 (ID/Mg=0.10, 7.6116 mmol, 1.85 g) in 2 mL of chlorobenzene was introduced at 110° C. The last repetition of steps 10) and 11) is carried out at 120° C. instead of 115° C. (yield: 3.4 g).

Example 8

Steps 1-14 according to Example 3 were repeated. The addition of activator and internal donor was doubled, there was twice an addition, once in step 4 as disclosed in Example 3 and once in step 10, where N,N'-dimethyl benzamide (BA/Mg=0.15, 11.4174 mmol, 1.71 g) in 3 mL of chlorobenzene, followed by iPiHex (ID/Mg=0.10, 7.6116 mmol, 1.75 g) in 2 mL of chlorobenzene was introduced at 110° C. The last repetition of steps 10) and 11) is carried out at 120° C. instead of 115° C. (yield: 6.2 g).

Example 9

Steps 1-14 according to Example 3 were repeated. The addition of activator and internal donor was doubled, there was twice an addition, once in step 4 as disclosed in Example 3 and once in step 10, where N,N'-dimethyl benzamide (BA/Mg=0.15, 5.7084 mmol, 0.86 g) in 3 mL of chlorobenzene, followed by iPnPen (ID/Mg=0.10, 3.8058 mmol, 0.82 g) in 2 mL of chlorobenzene was introduced at 110° C. The last repetition of steps 10) and 11) is carried out at 120° C. instead of 115° C. (yield: 3.3 g).

Example 10

Steps 1-14 according to Example 3 were repeated. The addition of activator and internal donor was doubled, there was twice an addition, once in step 4 as disclosed in Example 3 and once in step 10, where N,N'-dimethyl benzamide (BA/Mg=0.15, 5.7084 mmol, 0.86 g) in 3 mL of chlorobenzene, followed by iPiHex (ID/Mg=0.10, 3.8058 mmol, 0.88 g) in 2 mL of chlorobenzene was introduced 110° C. The last repetition of steps 10) and 11) is carried out at 120° C. instead of 115° C. (yield: 3.3 g).

Example 11

Steps 1-14 according to Example 1 were repeated. In step 2) phenyl-support was used instead of butyl-support. In step 4) first iPiPen and then BA are added instead of the other way around. (yield: 2.7 gram).

Example 13

Steps 1-14 according to Example 1 were repeated. In step 4) iPen (ID/Mg=0.10) was added instead of iPiPen.

Example 18

Steps 1-14 according to Example 1 were repeated. In step 4) CP (ID/Mg=0.10) was added instead of iPiPen.

Example 19

Steps 1-14 according to Example 1 were repeated. In step 4) CPiP (ID/Mg=0.10) was added instead of iPiPen.

Comparative Example 1 (C1)

Steps 1-14 according to Example 1 were repeated. Half the amounts were used of the support, activator, internal donor, TiCl$_4$ and chlorobenzene. In step 4) 9,9-bis(methoxymethyl) fluorene (Flu) (ID/Mg=0.10) was added instead of iPiPen.

Comparative Example 12

Steps 1-14 according to Example 1 were repeated. In step 4) iPiB (ID/Mg=0.10) was added instead of iPiPen.
It has been shown that the Yield is very low 15.7 Kg/g compare to the invention when another internal electron donor according to Formula I:

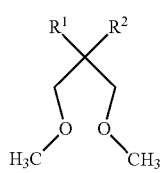

Formula I wherein $R^1$ is a secondary alkyl group and $R^2$ is a non-secondary alkyl group having at least 5 carbon atoms, preferably $R^2$ is a non-secondary alkyl group being branched at the 3-position or further positions, is used.

Polymerization Method 1

Solutions of both the co-catalyst (triethyl aluminum (1.219M in heptane); Al/Ti 160) and the external electron donor (di-isobutyl dimethoxy silane (DiBDMS; 0.162M in heptane) Si/Ti 11.3) were added to the reactor with nitrogen-flushed pipettes at ambient temperature and ambient pressure. The amount of heptane was adjusted to be 3 ml in total. Then approx. 100 gram of propylene/hydrogen mixture (99 vol. % propylene, 1 vol. % hydrogen, viz. a 1 vol. % hydrogen pressure) was dosed to the reactor after which the reactor was heated to 50° C. A suspension of procatalyst (5 mg of a 14.6 wt. % suspension in mineral oil) mixed with approx. 5 gr of inert homo-polypropylene powder was dosed to the reactor by a 16 barg liquid propylene flow. After 1 minute, the temperature and pressure were slowly increased to 70° C. and 24 barg over a period of 10 minutes. After this, all conditions were kept constant for one hour. After 1 h the reactor was vented to 15 barg within 2 minutes, the stirrer was turned off and the reactor was cooled down and vented to ambient conditions within 1-2 minutes. At ambient conditions the reactor was opened and the polymer was collected.

Polymerization Method 2

Solutions of both the co-catalyst (triethyl aluminum (1.219M in heptane); Al/Ti 160) and the external electron donor (di-isobutyl dimethoxy silane (DiBDMS; 0.162M in heptane) Si/Ti 11.3) were added to the reactor with nitrogen-flushed pipettes at ambient temperature and ambient pressure. Then a propylene/hydrogen mixture (99 vol. % propylene, 1 vol. % hydrogen, viz. a 1 vol. % hydrogen pressure) was dosed to the reactor. A suspension of procatalyst (5 mg of a 14.6 wt. % suspension in mineral oil) was dosed to the reactor by a 16 barg liquid propylene flow. The mixture was pre-polymerized for 15 minutes at ambient temperature while stirring. Then the temperature was raised to 70° C. and the pressure was raised to 20 barg, starting the polymerization. The mixture is allowed to polymerize for 1 h at these conditions. Afterwards, the temperature and pressure are lowered to ambient conditions. Then the reactor was opened and the polymer was collected. Usually, the method 1 provides higher polymer yields than method 2.

Measurement Methods

Titanium content as used in the present description is measured using XRF analysis. An AXIOS Advanced WDXRF spectrometer from Panalytical with a Rhodium X-ray source and a customized set-up to be able to measure solid samples under inert conditions has been used. The unit is weight percentage (wt. %) calculated on the total weight of the procatalyst.

Internal donor content, activator content and ethoxy as used in the present description is measured using GC with the following method. A sample was quenched with HCl, diluted with acetonitrile and 1-propanol was added as internal standard. GC analysis was performed on an Agilent 7890B gas chromatograph equipped with a split/splitless injector and a FID. The injector was operated in split mode (ratio 100:1) at 250° C. Helium was used as a carrier gas with a constant flow at 1 mL/min. In the oven, a 25 m×0.250 mm×0.20 μm CP-Wax 52 CB column from Agilent was used with a ramp temperature ranging from 30° C. to 220° C. MassHunter software was used for data acquisition and ChemStation software was used for peak integration. The unit is weight percentage (wt. %) calculated on the total weight of the procatalyst.

Polymer yield as used in the present description is measured by weighing the polymer obtained; it is the production rate. The unit of polymer yield is the amount in kilogram of polymer obtained per gram of procatalyst used (kg/g).

Bulk density (BD) as used in the present description is the weight per unit volume of a material; it is measured as apparent density according to ASTM D1895-96 Reapproved 2010-e1, test method A.

MFR as used in the present description is the melt flow rate (unit is dg/min) and is measured at 230° C. with 2.16 kg load, according to ISO 1133: 2005.

XS as used in the present description is the amount of xylene solubles measured according to ASTM D 5492-10. The unit is weight percentage (wt. %) calculated on the total weight of the polymer obtained.

CX value as used in the present description is measured using a CRYSTEX® instrument under the following protocol: 2.5 g of polymer material is placed in a 240 ml brown glass vial together with a small magnetic stirrer to be analysed by a CRYSTEX® QC machine by PolymerChar®. 200 mL of stabilized 1,2,4-trichlorobenzene (stabilizer: butyl hydroxy toluene (BHT, 300 mg per L) is used as a solvent. Dissolution of the sample, separation of the soluble from the crystalline fraction and quantification of the soluble fraction (via integrated IR detection, IR4) is done automatically by the machine. Process parameters: Dissolution temperature: 175° C., dissolution time: 60 min, injection needle temperature: 175° C., start temperature detector and oven section: 165° C., precipitation: 40° C. flow rate (elution): 3 mL/min.

Calibration of the instrument was done under the same conditions measuring the following standard samples provided by Polymer Char®:
PP-FS-H (XS 2.4%), PP-FS-R (XS 7.0%), PP-FS-A (XS 11.1%), PP-FS-B (XS 16.7%), PP-FS-C (XS 32.6%).

Al/Ti as used in the present description is the molar ratio of aluminium (of the co-catalyst) to titanium (of the procatalyst) added to the reactor.

Si/Ti as used in the present description is the molar ratio of silicon (of the external donor) to titanium (of the procatalyst) to the reactor.

Tables 1, 2, and 3 below show the results of the Experiments.

Effect of Double Split Addition of International Electron Donor

When Example 2 is compared to Example 7, the effect of double internal donor addition can be observed addition, being an increase in the internal donor content, and a decrease in the CX value. The polymer yield is however somewhat decreased.

Effect of Grignard Support

When example 11 is compared to example, it can be observed that both butyl Grignard and Phenyl Grignard supports may be used according to the present invention.

Effect of Polymerization Method

When Example 2 is compared to Example 15, which procatalyst are prepared according to the same method, the effect of the polymerization method can be observed. Example 2 is carried out using method 1 whereas Example 15 is carried out using method 2. The polymer yield according to method 1 is higher (57.8 vs 34.2 g/L).

When Example 3 is compared to Example 16, which procatalyst are prepared according to the same method, the effect of the polymerization method can be observed. Example 3 is carried out using method 1 whereas Example 16 is carried out using method 2. The polymer yield according to method 1 is higher (50.2 vs 37.1 g/L).

When Example 3 is compared to Example 16, which procatalyst are prepared according to the same method, the effect of the polymerization method can be observed. Example 3 is carried out using method 1 whereas Example 16 is carried out using method 2. The polymer yield according to method 1 is higher (50.2 vs 42.3 g/L).

This shows that the polymer yield is higher when using method 1 compared to method 2.

Table 1. Results From Polymerization Method 1 Using Different Internal Donors According to the Invention

TABLE 1

| Ex. | Grignard type($R^4$) | Ti cont. (wt. %) | ID type cont. (wt. %) [#add.] | Act. Cont. (wt. %) | EtO cont. (wt. %) | Yield (Kg/g) | BD (g/L) | MFR (dg/min) | CX (wt. %) |
|---|---|---|---|---|---|---|---|---|---|
| 1 | Butyl | 2.5 | iPiPen 10.5 [1] | BA-2Me 0.4 | 0.3 | 50.0 | 416 | 12.88 | 4.10 |
| 2 | Butyl | 2.75 | CPiPen 9.8 [1] | BA-2Me 0.65 | 0.45 | 57.8 | 423 | 10.77 | 3.88 |
| 3 | Butyl | 2.5 | iPiHex 11.3 [1] | BA-2Me 0.3 | 0.5 | 50.2 | 478 | 16.2 | 4.1 |
| 4 | Butyl | 2.5 | iPnPen 11.9 [1] | BA-2Me 0.2 | 0.4 | 50.2 | 430 | 15.5 | 3.76 |
| 5 | Butyl | 2.50 | iPiHex 10.3 [1] | BA-2Me 0.5 | 0.5 | 52.6 | 436 | 18.32 | 3.89 |
| 6 | Butyl | 2.3 | iPiPen 13.6 [2] | BA-2Me 1.4 | 0.4 | 54.2 | 428 | 10.06 | 2.14 |
| 7 | Butyl | 2.8 | CPiPen 11.9 [2] | BA-2Me 0.7 | 0.5 | 42.0 | 425 | 6.75 | 2.19 |
| 8 | Butyl | 2.3 | iPiHex 11.1 [2] | BA-2Me 1.0 | 0.4 | 45.4 | 425 | 12.77 | 2.98 |
| 9 | Butyl | 2.2 | iPnPen 13.0 [2] | BA-2Me 1.1 | 0.4 | 49.8 | 427 | 9.72 | 2.23 |
| 10 | Butyl | 2.3 | iPiHex 12.8 [2] | BA-2Me 1.1 | 0.4 | 37.6 | 420 | 9.16 | 2.74 |

TABLE 1-continued

| Ex. | Grignard type($R^4$) | Ti cont. (wt. %) | ID type cont. (wt. %) [#add.] | Act. Cont. (wt. %) | EtO cont. (wt. %) | Yield (Kg/g) | BD (g/L) | MFR (dg/min) | CX (wt. %) |
|---|---|---|---|---|---|---|---|---|---|
| 11 | Phenyl | 2.9 | iPiPen 11.5 [1] | BA-2Me 0.4 | 0.1 | 41.0 | 396 | 15.0 | 4.45 |
| C1 | Butyl | 2.5 | Flu 12.6 [1] | BA-2Me 1.0 | 1.2 | 26.0 | 423 | n.d. | 5.34 | n.d. = not determined

Table 2. Results From Polymerization Method 2 Using Different Internal Donors According to the Invention

TABLE 2

| Exam. | Grignard type (R4) | Ti cont. (wt. %) | ID type cont. (wt. %) [#addition] | Act. Cont. (wt. %) | EtO cont. (wt. %) | Yield (Kg/g) | BD (g/L) | MFR (dg/min) | XS (wt. %) | CX (wt. %) |
|---|---|---|---|---|---|---|---|---|---|---|
| 12 | Butyl | 2.09 | iPiB 8.9 [1] | BA-2ME 0.5 | 1.0 | 15.7 | 418 | 13.29 | 1.3 | n.d. |
| 13 | Butyl | 2.44 | iPen 9.9 [1] | BA-2ME 0.5 | 0.7 | 42.1 | 424 | 16.45 | 3.2 | n.d. |
| 14 | Butyl | 2.57 | iPiPen 11.4 [1] | BA-2ME 1.2 | 1.1 | 32.3 | 415 | 12.02 | 1.5 | n.d. |
| 15 | Butyl | 2.75 | CPiPen 9.8 [1] | BA-2ME 0.65 | 0.45 | 34.2 | 425 | 8.41 | n.d. | 3.12 |
| 16 | Butyl | 2.5 | iPiHex 11.3 [1] | BA-2ME 0.3 | 0.5 | 37.1 | 420 | 16.15 | n.d. | 4.08 |
| 17 | Butyl | 2.5 | iPnPen 11.9 [1] | BA-2ME 0.2 | 0.4 | 42.3 | 439 | 13.63 | n.d. | 3.50 |
| 18 | Butyl | 2.70 | CP 8.1 [1] | BA-2ME 1.0 | 0.7 | 23.2 | 439 | 7.94 | 2.2 | n.d. |
| 19 | Butyl | 2.8 | CPiP 13.6 [1] | BA-2ME 0.3 | 0.8 | 25.8 | 430 | 9.65 | 1.9 | n.d. |

Table 3. Effect of the Use of Different Types of Activators (Polymerized Using Method 1)

TABLE 3

| Exam. | Grignard type ($R^4$) | Ti cont. (wt. %) | ID type cont. (wt. %) [#addition] | Act. Cont. (wt. %) | EtO cont. (wt. %) | Yield (Kg/g) | BD (g/L) | MFR (dg/min) | CX (wt. %) |
|---|---|---|---|---|---|---|---|---|---|
| 6 | Butyl | 2.3 | iPiPen 13.6 [2] | BA-2Me 1.4 | 0.4 | 54.2 | 427 | 10.06 | 2.14 |
| 20 | Butyl | 1.9 | iPiPen 12.1 [2] | None | 1.5 | 39.2 | 435 | 17.98 | 2.11 |
| 21 | Butyl | 2.3 | iPiPen 11.1 [2] | EB 0.7 | 0.7 | 30.0 | 430 | 13.77 | 2.84 |

Effect of Donors According to the Invention

When the examples are compared to comparative example 1 it can be seen that with the donors according to the present invention higher polymer yields and lower CX values are obtained. Thus one or more objects of the invention is achieved.

Effect of Type of Alkyl Group for $R^1$ and $R^2$

According to the present invention, it is preferred that $R^1$ is a secondary alkyl group and $R^2$ is a non-secondary alkyl group having at least 5 carbon atoms. In the Examples, only the compounds iPiB and iPen do not comply with this preferred embodiment, the former for having a C4 $R^2$ and the latter for not having a secondary $R^1$ group. When example 13 being iPen (non-secondary $R^1$) is compared to example 14 being iPiPen (secondary $R^1$)—both having a non-secondary iPen C5 $R^2$ group—the following is observed. The XS value is significantly lower.

When example 12 being iPiB (C4 non-secondary $R^2$) is compared to example 14 being iPiPen (C5 non-secondary $R^2$)—both having a secondary iP $R^1$ group—the following is observed. The polymer yield is sharply increased. The XS value is similar.

When example 18 CP (secondary $R^2$ group) is compared to example 19 CPiPen (non-secondary $R^2$ group) the following is observed. The XS value is lower.

The preferred substitution pattern according to the present invention is one secondary alkyl chain ($R^1$) that is immediately branched. It was found that this induces sufficient stereoselectivity. It was also found that with this type of donor a polymer is obtained having sufficiently low XS and/or CX. The other alkyl chain ($R^2$) in the donor is preferably sufficiently "open" (branching from 3-carbon atom) to ensure sufficient activity leading to sufficient polymer yield of the polymer during the polymerization process.

Most of the examples were carried out using N,N'-dimethylbenzamide (BA-2Me) as the activator. However, it is also possible to carry out the invention without the use of an activator or with the use of a different activator, such as ethylbenzoate. In order to show this, Examples 20 and 21 were carried out as shows in Table 3 compared to Example 1 having BA-2Me as the activator.

The invention claimed is:

1. A process for preparing a procatalyst for polymerization of olefins,
   said process comprising the steps of:
   i) contacting a compound $R^4_z MgX^4_{2-z}$ with an alkoxy- or aryloxy-containing silane compound to give a first intermediate reaction product, being a solid $Mg(OR^a)_x X^1_{2-x}$, wherein: $R^a$ is a linear, branched or cyclic hydrocarbyl group independently selected from alkyl, alkenyl, aryl, aralkyl, alkoxycarbonyl or alkylaryl groups, or one or more combinations thereof; wherein said hydrocarbyl group may be substituted or unsubstituted, may contain one or more heteroatoms; wherein $R^4$ is a linear, branched or cyclic hydrocarbyl group independently selected from alkyl, alkenyl, aryl, aralkyl, alkoxycarbonyl or alkylaryl groups, or one or more combinations thereof; wherein said hydrocarbyl group may be substituted or unsubstituted, may contain one or more heteroatoms; wherein $X^4$ and $X^1$ are each independently selected from fluoride (F—), chloride (Cl—), bromide (Br—) or iodide (I—); z is in a range of larger than 0 and smaller than 2, being $0<z<2$;

ii) optionally contacting the solid $Mg(OR^a)_xX^1_{2-x}$ obtained in step i) with at least one activating compound selected from the group formed by activating electron donors and metal alkoxide compounds of formula $M^1(OR^b)_{v-w}(OR^3)_w$ or $M^2(OR^b)_{v-w}(R^3)_w$, to obtain a second intermediate product; wherein: $M^1$ is a metal selected from Ti, Zr, Hf, Al or Si; v is the valency of $M^1$; $M^2$ is a metal being Si; v is the valency of $M^2$; $R^b$ and $R^3$ are each a linear, branched or cyclic hydrocarbyl group independently selected from alkyl, alkenyl, aryl, aralkyl, alkoxycarbonyl or alkylaryl groups, or one or more combinations thereof; wherein said hydrocarbyl group may be substituted or unsubstituted, may contain one or more heteroatoms; wherein w is smaller than v;

iii) contacting the first or second intermediate reaction product, obtained respectively in step i) or ii), with a halogen-containing Ti-compound and one or more internal electron donor compounds, wherein the one or more internal electron donor compounds consist of a compound represented by Formula I:

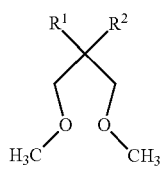

Formula I wherein $R^1$ is a secondary alkyl group and $R^2$ is a non-secondary alkyl group having at least 5 carbon atoms.

2. The process according to claim 1, wherein said secondary alkyl group is selected from the group consisting of isopropyl, 2-methylpropyl (sec-butyl), t-butyl, 2-methylbutyl, 2-ethylpropyl, cyclopentyl, 2,3-dimethylpropyl, 2-methylpentyl, 2-ethylbutyl, 2,3-dimethylbutyl, 2,4-dimethylbutyl, 2-methylhexyl, cyclohexyl, cycloheptyl, 2,3-dimethylpentyl, 2,4-dimethylpentyl, 2,5-dimethylpentyl, 2-n-propylbutyl, 2-i-propylbutyl, 2-methyl-3-ethylbutyl, and 2-ethyl-3-methylbutyl.

3. The process according to claim 1, wherein during step ii) as activating compounds an alcohol is used as activating electron donor and titanium tetraalkoxide is used as metal alkoxide compound.

4. The process according to claim 1, wherein an activator is present, and the activator is a benzamide according to formula X:

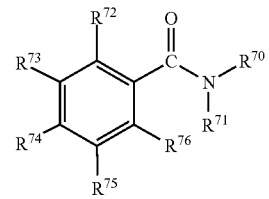

Formula X wherein $R^{70}$ and $R^{71}$ are each independently hydrogen or an alkyl, and $R^{72}$, $R^{73}$, $R^{74}$, $R^{75}$, $R^{76}$ are each independently selected from hydrogen, a heteroatom or a hydrocarbyl group, or one or more combinations thereof.

5. The process according to claim 1, wherein the internal electron donor is 5,5-bis(methoxymethyl)-2,8-dimethyl-nonane, according to Formula I wherein $R^1$ and $R^2$ are both iso-pentyl

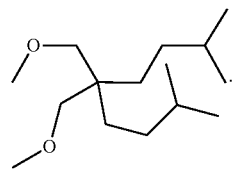 [SMILES: COCC(CCC(C)C)(CCC(C)C)COC]

6. The process according to claim 1, wherein the internal electron donor is 3,3-bis(methoxymethyl)-2,6-dimethyl heptane, according to Formula I wherein $R^1$ is iso-propyl and $R^2$ is iso-pentyl

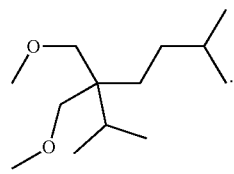

7. The process according to claim 1, wherein the internal electron donor is (1-methoxy-2-(methoxymethyl)-5-methyl-hexan-2-yl)cyclopentane, according to Formula I wherein $R^1$ is cyclopentyl and $R^2$ is iso-pentyl

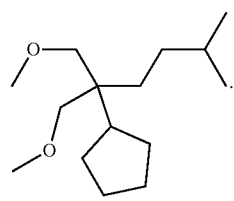 [SMILES: COCC(CCC(C)C)(COC)C1CCCC1]

8. The process according to claim 1, wherein the internal electron donor is 3,3-bis(methoxymethyl)-2,7-dimethyloctane, according to Formula I wherein $R^1$ is iso-propyl and $R^2$ is iso-hexyl

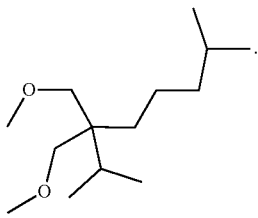 [SMILES: COCC(CCCC(C)C)(COC)C(C)C]

9. The process according to claim 1, wherein the internal electron donor is 3,3-bis(methoxymethyl)-2-methyloctane, according to Formula I wherein $R^1$ is iso-propyl and $R^2$ is n-pentyl

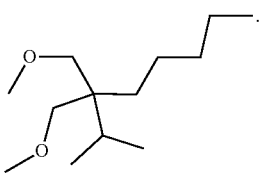

10. The process according to claim 1, wherein the internal electron donor is 3,3-bis(methoxymethyl)-2,6-dimethyloctane

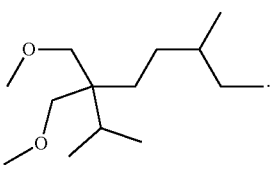 [SMILES: CCC(C)CCC(COC)(COC)C(C)C]

11. The process according to claim 1, wherein the internal electron donor is 3,3-bis(methoxymethyl)-2,4-dimethylheptane

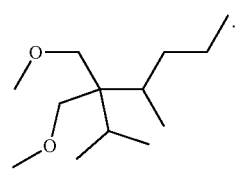

12. The process according to claim 1, wherein the internal electron donor is present in the procatalyst in an amount of at least 10 wt. %.

13. A process for preparing a polyolefin by contacting an olefin, with a procatalyst prepared by the process according to claim 1, a co-catalyst and optionally an external electron donor.

14. A polyolefin, obtained by the process according to claim 13.

15. The process according to claim 4, wherein $R^{70}$ and $R^{71}$ are both methyl and wherein $R^{72}$, $R^{73}$, $R^{74}$, and $R^{75}$ are all hydrogen, and the activator is N,N'-dimethylbenzamide.

16. A process for preparing a procatalyst for polymerization of olefins, comprising contacting a magnesium-containing support with a halogen-containing titanium compound, and an internal electron donor;
said process comprising the steps of:
i) contacting a compound $R^4_z MgX^4_{2-z}$ with an alkoxy- or aryloxy-containing silane compound to give a first intermediate reaction product, being a solid $Mg(OR^a)_x X^1_{2-x}$, wherein: $R^a$ is a linear, branched or cyclic hydrocarbyl group independently selected from alkyl, alkenyl, aryl, aralkyl, alkoxycarbonyl or alkylaryl groups, or one or more combinations thereof; wherein said hydrocarbyl group may be substituted or unsubstituted, may contain one or more heteroatoms; wherein $R^4$ is a linear, branched or cyclic hydrocarbyl group independently selected from alkyl, alkenyl, aryl, aralkyl, alkoxycarbonyl or alkylaryl groups, or one or more combinations thereof; wherein said hydrocarbyl group may be substituted or unsubstituted, may contain one or more heteroatoms; wherein $X^4$ and $X^1$ are each independently selected from fluoride (F—), chloride (Cl—), bromide (Br—) or iodide (I—); z is in a range of larger than 0 and smaller than 2, being 0<z<2;
ii) optionally contacting the solid $Mg(OR^a)_x X^1_{2-x}$ obtained in step i) with at least one activating compound selected from the group formed by activating electron donors and metal alkoxide compounds of formula $M^1(OR^b)_{v-w}(OR^3)_w$ or $M^2 (OR^b)_{v-w}(R^3)_w$, to obtain a second intermediate product; wherein: $M^1$ is a metal selected from Ti, Zr, Hf, Al or Si; v is the valency of $M^1$; $M^2$ is a metal being Si; v is the valency of $M^2$; $R^b$ and $R^3$ are each a linear, branched or cyclic hydrocarbyl group independently selected from alkyl, alkenyl, aryl, aralkyl, alkoxycarbonyl or alkylaryl groups, or one or more combinations thereof; wherein said hydrocarbyl group may be substituted or unsubstituted, may contain one or more heteroatoms; wherein w is smaller than v;
iii) contacting the first or second intermediate reaction product, obtained respectively in step i) or ii), with a halogen-containing Ti-compound,
wherein the internal electron donor comprises (1-methoxy-2-(methoxymethyl)-5-methylhexan-2-yl)cyclopentane, 3,3-bis(methoxymethyl)-2-methyloctane, 3,3-bis(methoxymethyl)-2,6-dimethyloctane, 3,3-bis(methoxymethyl)-2,4-dimethylheptane, or a combination thereof.

17. The process according to claim 16, wherein the internal electron donor comprises (1-methoxy-2-(methoxymethyl)-5-methylhexan-2-yl)cyclopentane.

18. The process according to claim 16, wherein the internal electron donor comprises 3,3-bis(methoxymethyl)-2-methyloctane.

19. The process according to claim 16, wherein the internal electron donor comprises 3,3-bis(methoxymethyl)-2,6-dimethyloctane.

20. The process according to claim 16, wherein the internal electron donor comprises 3,3-bis(methoxymethyl)-2,4-dimethylheptane.

* * * * *